United States Patent
Matsumoto et al.

(10) Patent No.: US 12,375,201 B2
(45) Date of Patent: Jul. 29, 2025

(54) OPTICAL AMPLIFIER, OPTICAL AMPLIFIER CONTROLLING METHOD, AND OPTICAL TRANSMISSION SYSTEM

(71) Applicant: NEC Corporation, Tokyo (JP)

(72) Inventors: Keiichi Matsumoto, Tokyo (JP); Hitoshi Takeshita, Tokyo (JP); Hidemi Noguchi, Tokyo (JP); Emmanuel Le Taillandier de Gabory, Tokyo (JP)

(73) Assignee: NEC CORPORATION, Tokyo (JP)

( * ) Notice: Subject to any disclaimer, the term of this patent is extended or adjusted under 35 U.S.C. 154(b) by 285 days.

(21) Appl. No.: 18/031,208

(22) PCT Filed: Oct. 26, 2020

(86) PCT No.: PCT/JP2020/040136
§ 371 (c)(1),
(2) Date: Apr. 11, 2023

(87) PCT Pub. No.: WO2022/091187
PCT Pub. Date: May 5, 2022

(65) Prior Publication Data
US 2023/0412297 A1 Dec. 21, 2023

(51) Int. Cl.
*H04B 10/00* (2013.01)
*H01S 3/067* (2006.01)
(Continued)

(52) U.S. Cl.
CPC .... *H04J 14/02216* (2023.08); *H01S 3/06754* (2013.01); *H04J 14/0212* (2013.01); *H04J 14/04* (2013.01)

(58) Field of Classification Search
CPC .. H04B 10/29; H04B 10/291; H04B 10/2912; H04B 10/293; H04B 10/2931;
(Continued)

(56) References Cited

U.S. PATENT DOCUMENTS

2006/0023298 A1* 2/2006 Ohshima ............. H01S 3/06754
359/349
2015/0229438 A1 8/2015 Le Taillandier De Gabory et al.
(Continued)

FOREIGN PATENT DOCUMENTS

JP 2006-066862 A 3/2006
JP 2020-014113 A 1/2020
(Continued)

OTHER PUBLICATIONS

International Search Report for PCT Application No. PCT/JP2020/040136, mailed on Dec. 28, 2020.
(Continued)

*Primary Examiner* — Daniel G Dobson
(74) *Attorney, Agent, or Firm* — Sughrue Mion, PLLC

(57) ABSTRACT

An optical amplifier that amplifies an incident WDM signal and includes cores having an amplification medium, the optical amplifier includes: a wavelength demultiplexer configured to demultiplex the incident WDM signal into wavelength bands and introducing the demultiplexed WDM signals into the cores separately; a wavelength multiplexer configured to multiplex amplified optical signals propagated through the cores and outputting the multiplexed signal; and an wavelength demultiplexing controller configured to monitor an amplification rate of a specific wavelength band
(Continued)

of an amplified WDM signal or a scale associated with an amplification rate of a specific wavelength band, demultiplexing, from the incident WDM signal, an optical signal of a wavelength band having relatively-small optical amplification efficiency according to a monitoring result, and controlling demultiplexing performed by the wavelength demultiplexer in such a way as to amplify, with a relatively-large amplification rate, the optical signal of the wavelength band having relatively-small optical amplification efficiency.

12 Claims, 18 Drawing Sheets

(51) Int. Cl.
  *H04J 14/02* (2006.01)
  *H04J 14/04* (2006.01)
  *H04J 14/00* (2006.01)

(58) Field of Classification Search
  CPC .............. H04B 10/294; H04B 10/2942; H04B 10/296; H01S 3/06754; H01S 3/06737; H01S 3/10069; H01S 3/1305; H01S 3/1306
  See application file for complete search history.

(56) References Cited

U.S. PATENT DOCUMENTS

| | | | |
|---|---|---|---|
| 2019/0305504 A1* | 10/2019 | Goodno | H01S 3/1308 |
| 2022/0045473 A1 | 2/2022 | Matsumoto et al. | |
| 2022/0115830 A1* | 4/2022 | Yanagimachi | H01S 3/0014 |

FOREIGN PATENT DOCUMENTS

| | | |
|---|---|---|
| WO | 2014/038095 A1 | 3/2014 |
| WO | 2020/137820 A1 | 7/2020 |
| WO | 2020/171103 A1 | 8/2020 |

OTHER PUBLICATIONS

English translation of Written opinion for PCT Application No. PCT/JP2020/040136, mailed on Dec. 28, 2020.

Ministry of Internal Affairs and Communications, Overview of FY2019 R&D Results, "Research on Spatial Multiplex Optical Communications Applied to Scalable Photonic Nodes. High-speed Communications/Broadcast R&D Committee", Resolution No. 18801, Jan. 2020, pp. 1-5, [retrieved on Dec. 14, 2020], internet : <URL:https://www2.nict.go.jp/commission/seika/r01/18801_gaiyo_g.pdf>.

Shigeyuki Yanagimachi et al., "Research on Low Power Consumed Multi-Core Amplifier for Optical Submarine System", The Institute of Electronics, Information and Communication Engineers, 2020 Proceedings of the IEICE General Conference 2, Mar. 3, 2020, pp. SS-64 to SS-65.

\* cited by examiner

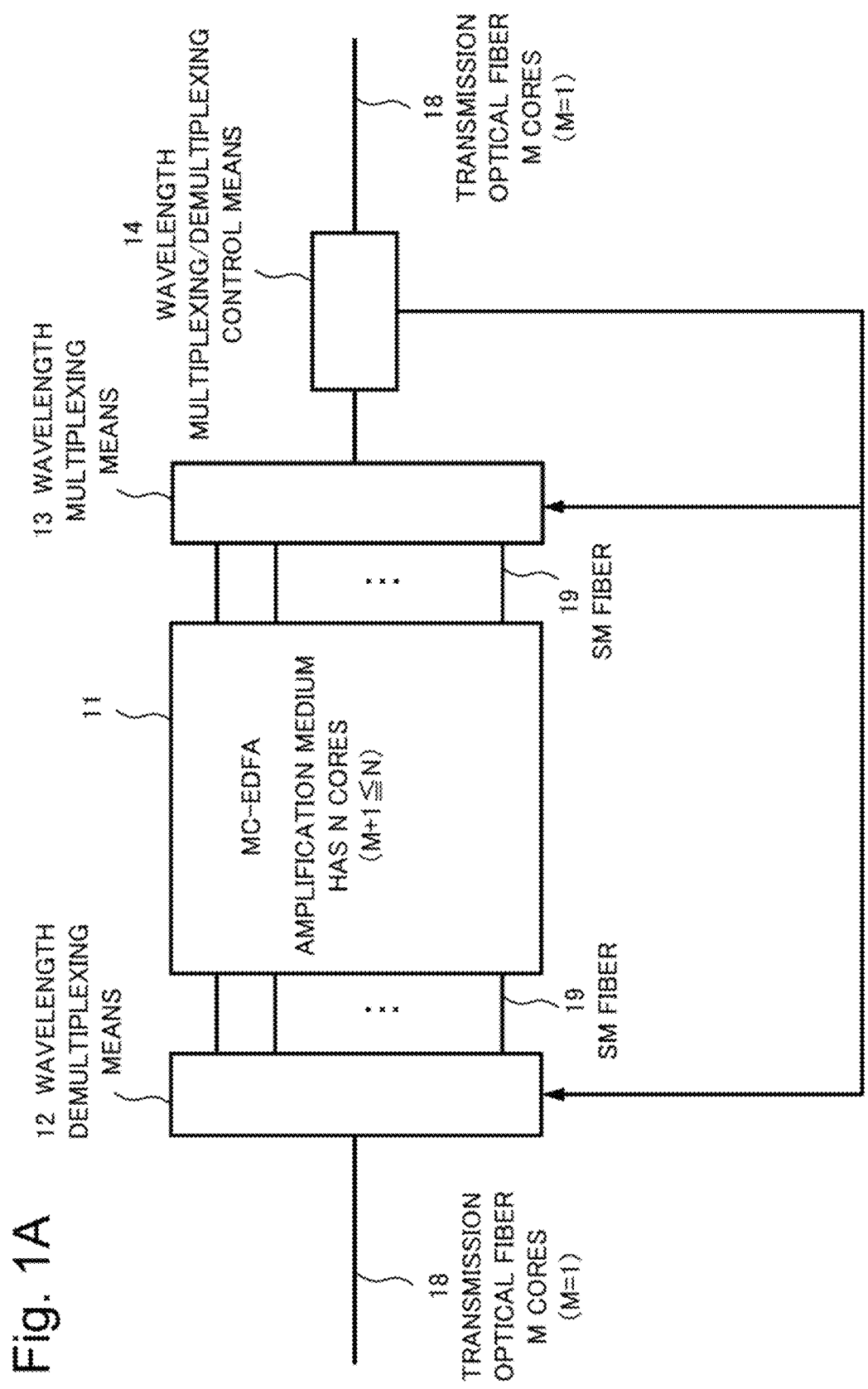

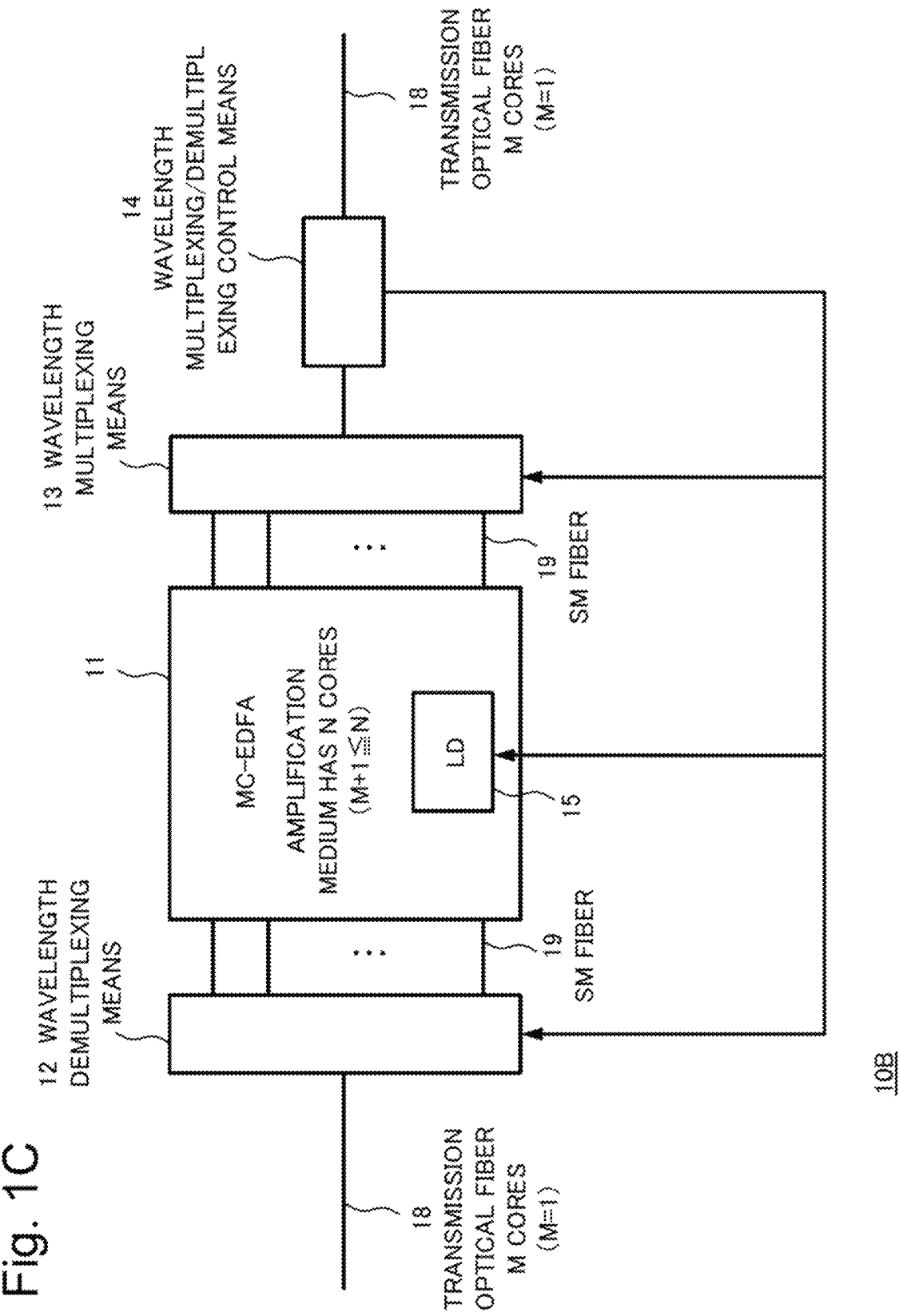

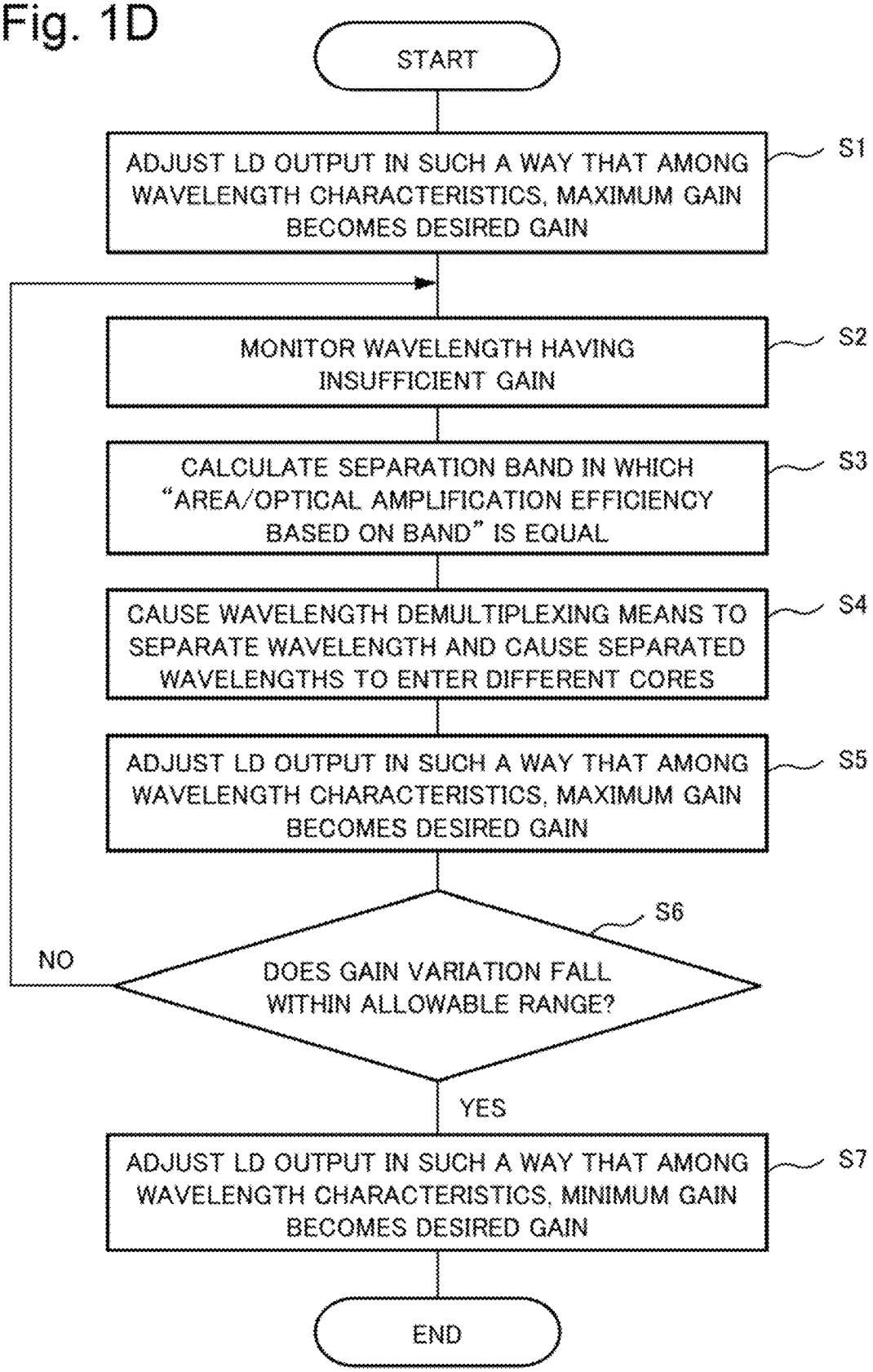

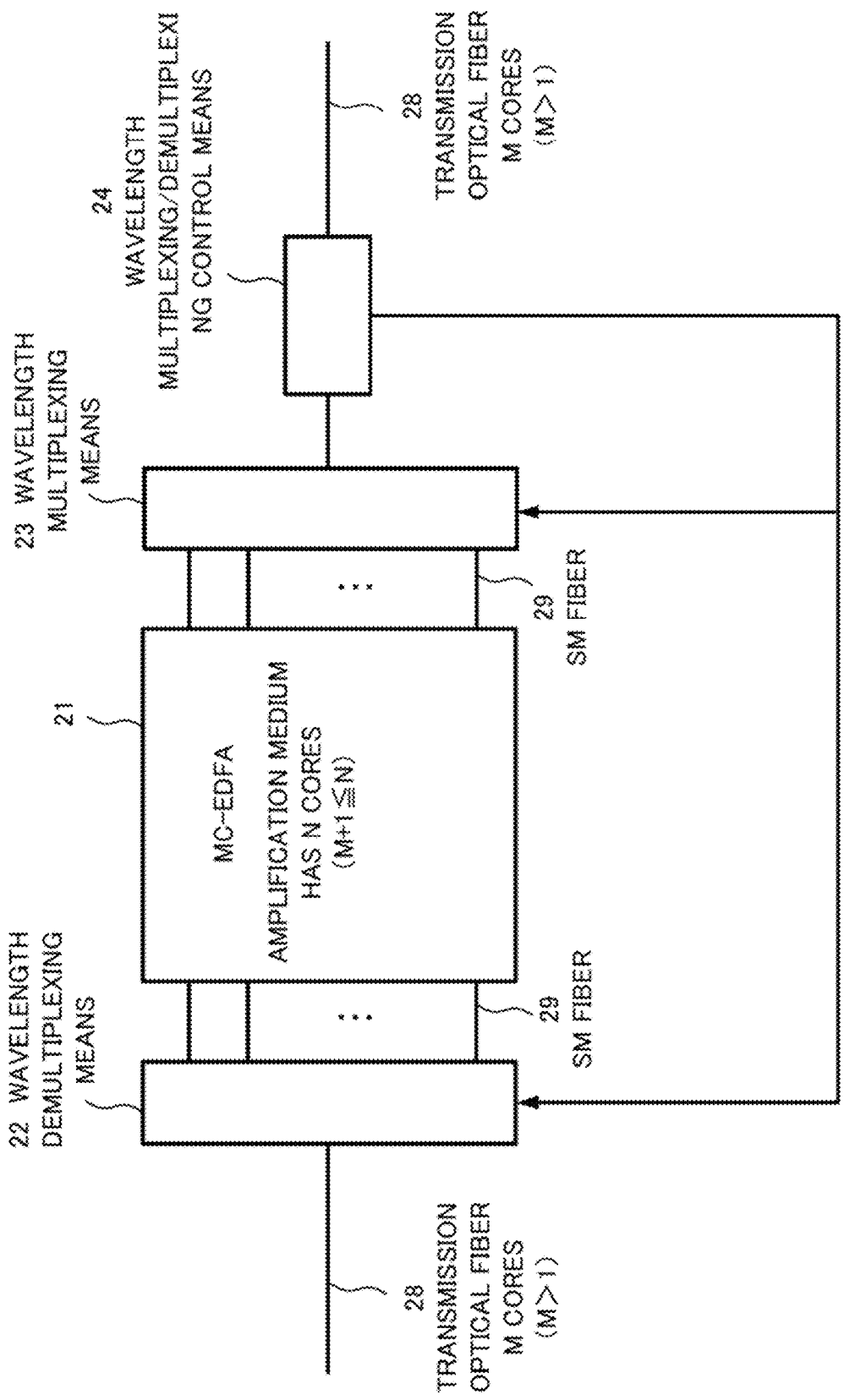

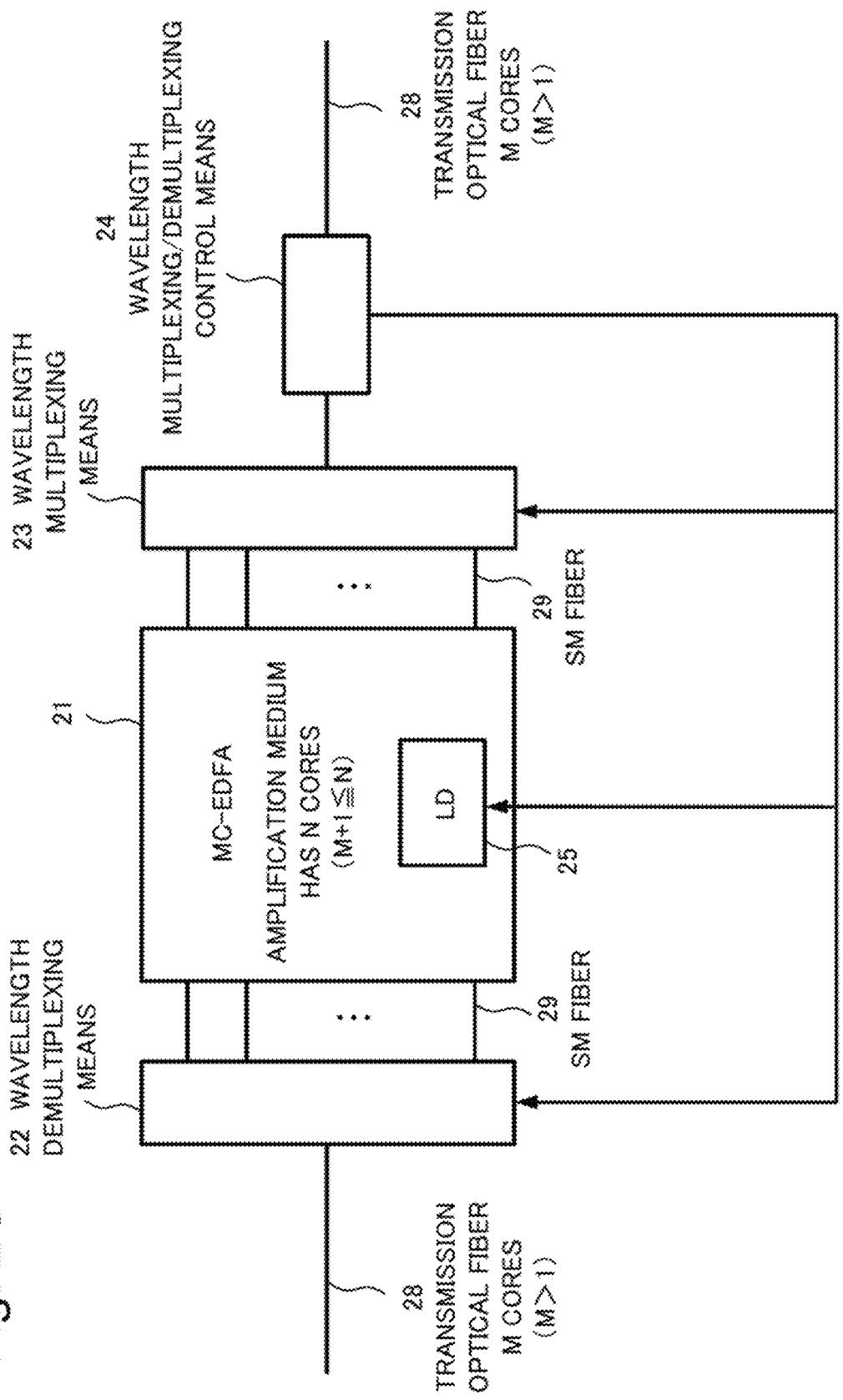

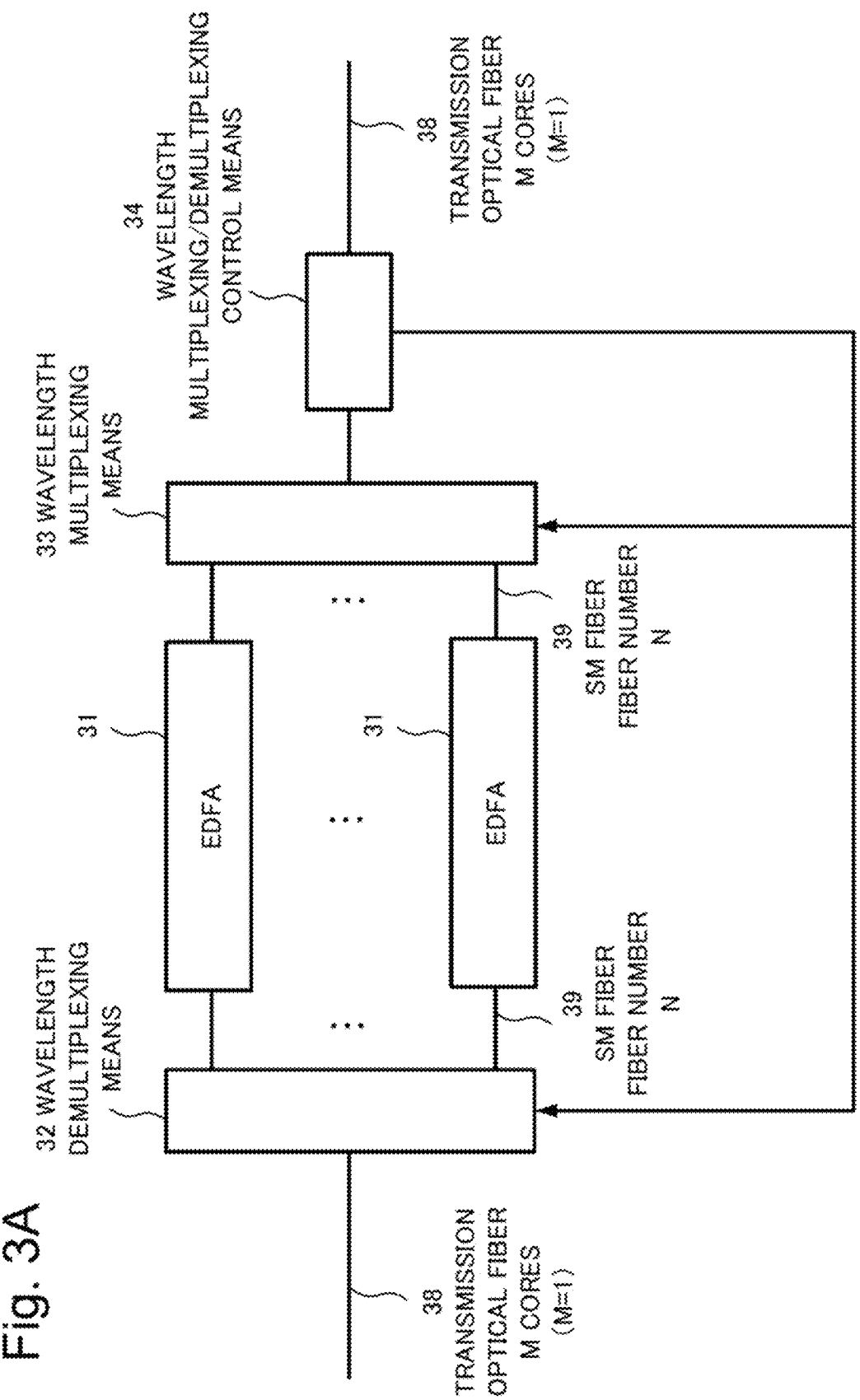

OPTICAL AMPLIFIER, OPTICAL AMPLIFIER CONTROLLING METHOD, AND OPTICAL TRANSMISSION SYSTEM

This application is a National Stage Entry of PCT/JP2020/040136 filed on Oct. 26, 2020, the contents of all of which are incorporated herein by reference, in their entirety.

TECHNICAL FIELD

The present invention relates to an optical amplifier, an optical amplifier controlling method, and an optical transmission system, and in particular, relates to an optical fiber amplifier that amplifies signal intensity of an optical signal.

BACKGROUND ART

As an optical fiber amplifier that amplifies signal intensity of an optical signal, known is an optical fiber amplifier that inputs excitation light being output from an excitation light source to a rare earth element doped fiber to which an optical signal is input, and thereby, amplifies signal intensity of an optical signal. An optical fiber amplifier having a structure in which, for example, erbium (Er) as one example of the rare earth element is doped in a core portion of a fiber is known.

An optical fiber amplifier to be used for a 1.55-μm band being a low-loss wavelength band in optical fiber communication has a structure in which erbium is doped in a core portion of a fiber, activates erbium ions in an optical fiber by using excitation light of a 0.98-μm band or a 1.48-μm band, and uses laser transition of the 1.55-μm band possessed by the erbium, and thereby sufficiently amplifies, based on semiconductor laser diode excitation, signal light of the 1.55-μm band.

An optical fiber amplifier exhibits high efficiency and high gain and has a gain being substantially polarization-independent, and therefore is used as an optical-signal repeater amplifier for an optical fiber communication system. In an optical fiber communication system, a wavelength division multiplexing (WDM) transmission technique for multiplexing a plurality of wavelengths in order to enable large-capacity communication is employed, and an amplifier collectively amplifies all channels. However, in an optical fiber transmission repeater system that transmits wavelength division multiplexing signal light (hereinafter, referred to as WDM signal light), a gain on an optical amplifier is different with respect to each wavelength, and therefore a difference in intensity of an optical signal is generated between wavelengths. Therefore, an optical gain equalization filter that reduces a gain deviation of an optical signal is incorporated in the optical fiber transmission repeater system, and when a gain deviation occurs in an output of an optical repeater, a gain deviation generated in the optical amplifier is equalized by the gain equalization filter, and thereby, adjustment to a state where excellent transmission quality is acquired is made.

PTL 1 proposes that a gain deviation generated in an optical amplifier is equalized by a gain equalization filter.

CITATION LIST

Patent Literature

PTL 1: International Publication No. WO2020/137820

SUMMARY OF INVENTION

Technical Problem

In the optical amplifier in Background Art, when a wavelength filling rate of a WDM signal incident from a transmission optical fiber becomes high, a signal gain variation between wavelengths increases. In an actual operation of the optical amplifier in Background Art, the optical amplifier is set in such a way as to optically amplify also a wavelength having the lowest signal gain beyond a desired gain, and signal light of a wavelength band having been excessively amplified is attenuated by a gain equalizer in a latter stage.

Description is made with reference to a drawing, as follows: when a WDM signal is amplified by the optical amplifier in Background Art being inserted in an optical transmission path as illustrated by FIG. 7B, the optical amplifier is set in such a way as to perform optical amplification beyond a desired gain indicated by a horizontal line in FIG. 7A and to optically amplify a wavelength having the lowest signal gain beyond a desired gain. In the WDM signal amplified by the optical amplifier of FIG. 7B in this manner, a portion in which a desired gain is exceeded in FIG. 7C is attenuated and equalized by a gain equalizer in a latter stage. When the portion in which a desired gain is exceeded is attenuated by the gain equalizer, an energy loss is generated.

Therefore, in the optical amplifier in Background Art, when a variation between wavelengths is large and the number of wavelengths excessively amplified is large, there is a problem that usage of a supplied-power resource is inefficient. In a clad collective excitation method having a problem in optical amplification efficiency, the influence is remarkable.

Therefore, an object of the present invention is to provide an optical amplifier, an optical amplifier controlling method, and an optical transmission system that are capable of reducing wavelength dependency of a signal gain while increasing usage efficiency of a supplied-power resource.

Solution to Problem

An optical amplifier according to the present invention is an optical amplifier that amplifies an incident wavelength division multiplexing (WDM) signal and includes two or more cores including an amplification medium, the optical amplifier including:
  a wavelength demultiplexing means for demultiplexing the incident WDM signal into two or more wavelength bands and introducing the demultiplexed WDM signals into the two or more cores separately; a wavelength multiplexing means for multiplexing optical signals propagated through the two or more cores and amplified, and outputting the multiplexed signal; and a wavelength demultiplexing control means for monitoring an amplification rate of a specific wavelength band of an amplified WDM signal or a scale associated with the amplification rate of the specific wavelength band, demultiplexing, from the incident WDM signal, an optical signal of a wavelength band having relatively-small optical amplification efficiency according to a monitoring result, and controlling demultiplexing performed by the wavelength demultiplexing means in such a way as to amplify, with a relatively-large amplification rate, the optical signal of the wavelength band having relatively-small optical amplification efficiency.

An optical transmission system according to the present invention includes: a transmission optical fiber connecting terminals; and the optical amplifier into which the WDM signal is incident from the transmission optical fiber, the optical amplifier being inserted in the transmission optical fiber.

An optical amplifier controlling method according to the present invention is a method of controlling an optical amplifier into which a wavelength division multiplexing (WDM) signal is incident from a transmission optical fiber having M cores (M≥1), the method including:
- monitoring an optical signal of a specific wavelength band of a WDM signal amplified by the optical amplifier;
- demultiplexing, from the WDM signal incident from the transmission optical fiber, the optical signal of the specific wavelength band according to a monitoring result; and
- separately amplifying the optical signal of the specific wavelength band and the WDM signal from which the optical signal of the specific wavelength is demultiplexed, multiplexing the amplified optical signal of the specific wavelength band and the amplified WDM signal from which the optical signal of the specific wavelength is demultiplexed, and outputting the multiplexed signal.

Advantageous Effects of Invention

According to the present invention, it is possible to provide an optical amplifier, an optical amplifier controlling method, and an optical transmission system that are capable of reducing wavelength dependency of a signal gain while increasing usage efficiency of a supplied-power resource.

BRIEF DESCRIPTION OF DRAWINGS

FIG. 1A is a configuration diagram for describing an optical amplifier according to a first example embodiment of the present invention.

FIG. 1C is a configuration diagram for describing a modified example of the optical amplifier according to the first example embodiment of the present invention.

FIG. 1D is a flowchart for describing a method of controlling the optical amplifier in FIG. 1C.

FIG. 2A is a configuration diagram for describing an optical amplifier according to a second example embodiment of the present invention.

FIG. 2C is a configuration diagram for describing a modified example of the optical amplifier according to the second example embodiment of the present invention.

FIG. 3A is a configuration diagram for describing an optical amplifier according to a third example embodiment of the present invention.

EXAMPLE EMBODIMENT

Example embodiments according to the present invention are described in detail with reference to the drawings.

First Example Embodiment

First, an optical amplifier, an optical amplifier controlling method, and an optical transmission system according to a first example embodiment of the present invention are described. FIG. 1A is a configuration diagram for describing the optical amplifier according to the first example embodiment of the present invention. The present example embodiment assumes a multi-core optical fiber amplifier as an optical amplifier. According to the present example embodiment, description is made by assuming, as the optical amplifier, a multi-core optical fiber amplifier having N cores (herein, N≥M+1) into which a wavelength division multiplexing (WDM) signal is incident from a transmission optical fiber having M cores (herein, M=1). In other words, description is made by assuming a multi-core optical fiber amplifier into which a WDM signal is incident from a transmission optical fiber having one core. Note that, as understood from the example embodiment described below, an optical amplifier applied with the present invention is not limited to a configuration of the example embodiment.

Configuration of Example Embodiment

Figure 6:
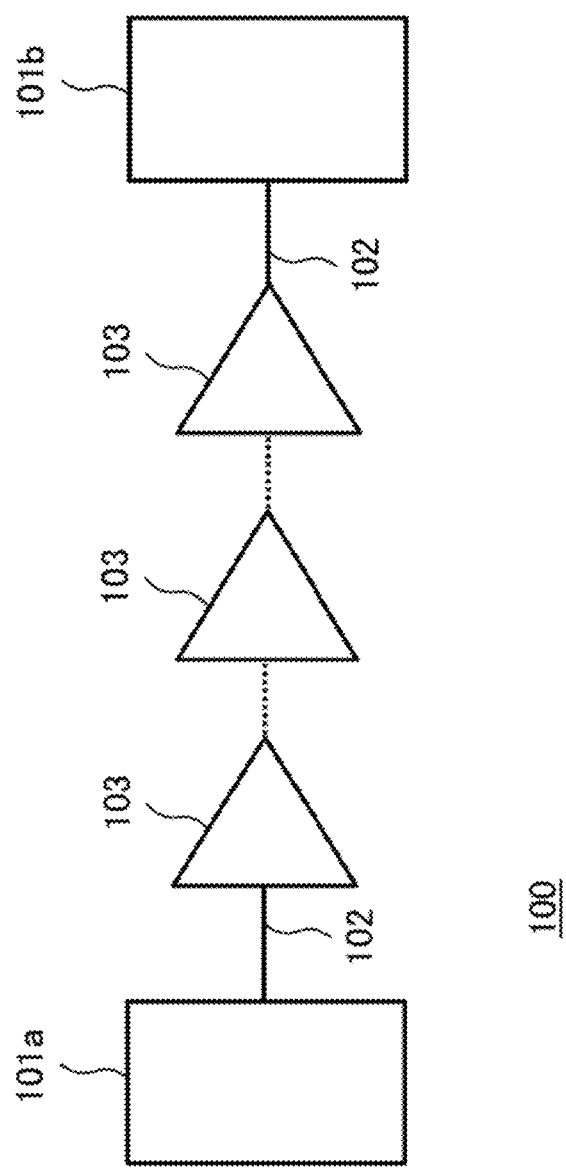
FIG. 6 is a configuration diagram for describing an optical transmission system according to the example embodiment of the present invention.
Figure 7A:
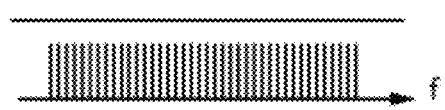
FIG. 7A is a graph illustrating optical intensity with respect to a wavelength of a WDM signal in Background Art.
Figure 7B:
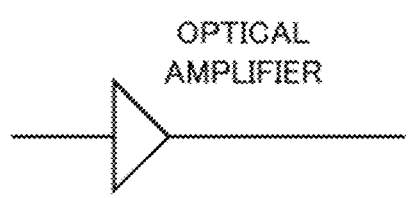
FIG. 7B is a configuration diagram for describing the optical amplifier in Background Art.
Figure 7C:
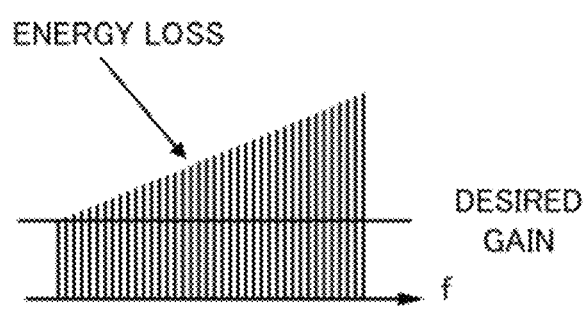
FIG. 7C is a graph illustrating optical intensity with respect to a wavelength of a WDM signal amplified by the optical amplifier in Background Art.

An optical amplifier 10 in FIG. 1A is used for an optical transmission system illustrated in FIG. 6. An optical transmission system 100 in FIG. 6 is configured by including a transmission optical fiber 102 connecting a terminal 101a and a terminal 101b and a repeater 103 being inserted in the transmission optical fiber 102. Normally, a plurality of repeaters 103 are inserted in one transmission optical fiber 102. The optical amplifier 10 in FIG. 1A is provided for one repeater 103 in FIG. 6 and amplifies an optical signal propagated through the transmission optical fiber 102.

The optical amplifier 10 in FIG. 1A includes a transmission optical fiber 18 having M cores (herein, M=1) and a multi-core erbium doped optical fiber amplifier (MC-EDFA) 11 inserted in the transmission optical fiber 18. The MC-EDFA 11 is a multi-core optical fiber amplifier having N cores (herein, N≥M+1) as an amplification medium and amplifies a WDM signal incident from the transmission optical fiber 18 having M cores. The MC-EDFA 11 is configured by disposing N cores in one clad.

The optical amplifier 10 in FIG. 1A further includes a wavelength multiplexing/demultiplexing means for a WDM signal incident from the transmission optical fiber 18. The wavelength multiplexing/demultiplexing means for a WDM signal includes a wavelength demultiplexing means 12 that performs demultiplexing according to a control signal and a wavelength multiplexing means 13 that multiplexes, according to a control signal, a plurality of optical signals demultiplexed by the wavelength demultiplexing means 12 and separately amplified by the MC-EDFA 11. The wavelength multiplexing means 13 and the wavelength demultiplexing means 12 are configured by using the same components and are different only in a direction of an optical signal, and therefore, a control signal provided for the wavelength multiplexing means 13 may be the same as a control signal provided for the wavelength demultiplexing means 12. When the wavelength multiplexing means 13 is configured in such a way as to perform multiplexing according to a control signal, it is expected that wavelength dependency on an insertion loss during multiplexing can be reduced, compared with when the wavelength multiplexing means 13 is configured in such a way as to passively perform multiplexing.

The wavelength demultiplexing means 12 and the wavelength multiplexing means 13 may be configured by using, for example, an array waveguide diffraction grating (AWG) or a wavelength selective switch (WSS). The WSS includes a port switch function for connection to output ports different with respect to each wavelength, an attenuation function for adjusting an optical intensity level with respect to each wavelength, a wavelength multiplexing function, and a wavelength separation function and may be considered to be achievable by controlling the port switch function and the attenuation function via reflection of a multiplexing/demultiplexing ratio to be described later. The AWG is an optical device that emits WDM signal light that has propagated through one waveguide to a free space, propagates the emitted WDM signal light through a plurality of waveguides different in waveguide length, and generates a phase difference, and then performs multiplexing or demultiplexing by using interference. In the AWG, a splitting ratio may be caused to be variable by changing a phase difference by externally applying heat or an electric field, and by applying such function, the wavelength demultiplexing means 12 and the wavelength multiplexing means 13 are considered to be achievable.

Note that, the wavelength demultiplexing means 12 and the MC-EDFA 11 are connected by N single-mode fibers 19 (SM fibers 19), and the MC-EDFA 11 and the wavelength multiplexing means 13 are connected by N single-mode fibers 19 (SM fibers 19). The optical amplifier 10 in FIG. 1A further includes a wavelength multiplexing/demultiplexing control means 14 that monitors a WDM signal multiplexed by the wavelength multiplexing means 13 and emitted to the transmission optical fiber 18 and supplies a control signal according to a monitoring result to the wavelength demultiplexing means 12 and the wavelength multiplexing means 13. As one example of control according to a monitoring result, the wavelength multiplexing/demultiplexing control means 14 sets or modifies a multiplexing/demultiplexing ratio for a WDM signal of the wavelength demultiplexing means 12 and the wavelength multiplexing means 13 according to the monitoring result. Herein, "the multiplexing/demultiplexing ratio" is defined as a ratio of a bandwidth of each wavelength band demultiplexed by the wavelength demultiplexing means 12 to the entire wavelength band included in the WDM signal.

The wavelength multiplexing/demultiplexing control means 14 monitors an amplification rate of a specific wavelength band. Alternatively, the wavelength multiplexing/demultiplexing control means 14 monitors optical amplification efficiency and a gain variation of a specific wavelength band. Alternatively, the wavelength multiplexing/demultiplexing control means 14 monitors optical amplification efficiency and a noise figure (NF) variation of a specific wavelength band. Alternatively, the wavelength multiplexing/demultiplexing control means 14 monitors optical amplification efficiency and a generalized optical signal to noise ratio (G-OSNR) variation of a specific wavelength band. The G-OSNR is a quality evaluation parameter of an optical communication system considering optical noise and quantified non-linear interference noise.

Monitoring of an NF variation of a specific wavelength band and monitoring of a G-OSNR variation of a specific wavelength band are described again in Other Example Embodiments to be described later.

Figure 1B:
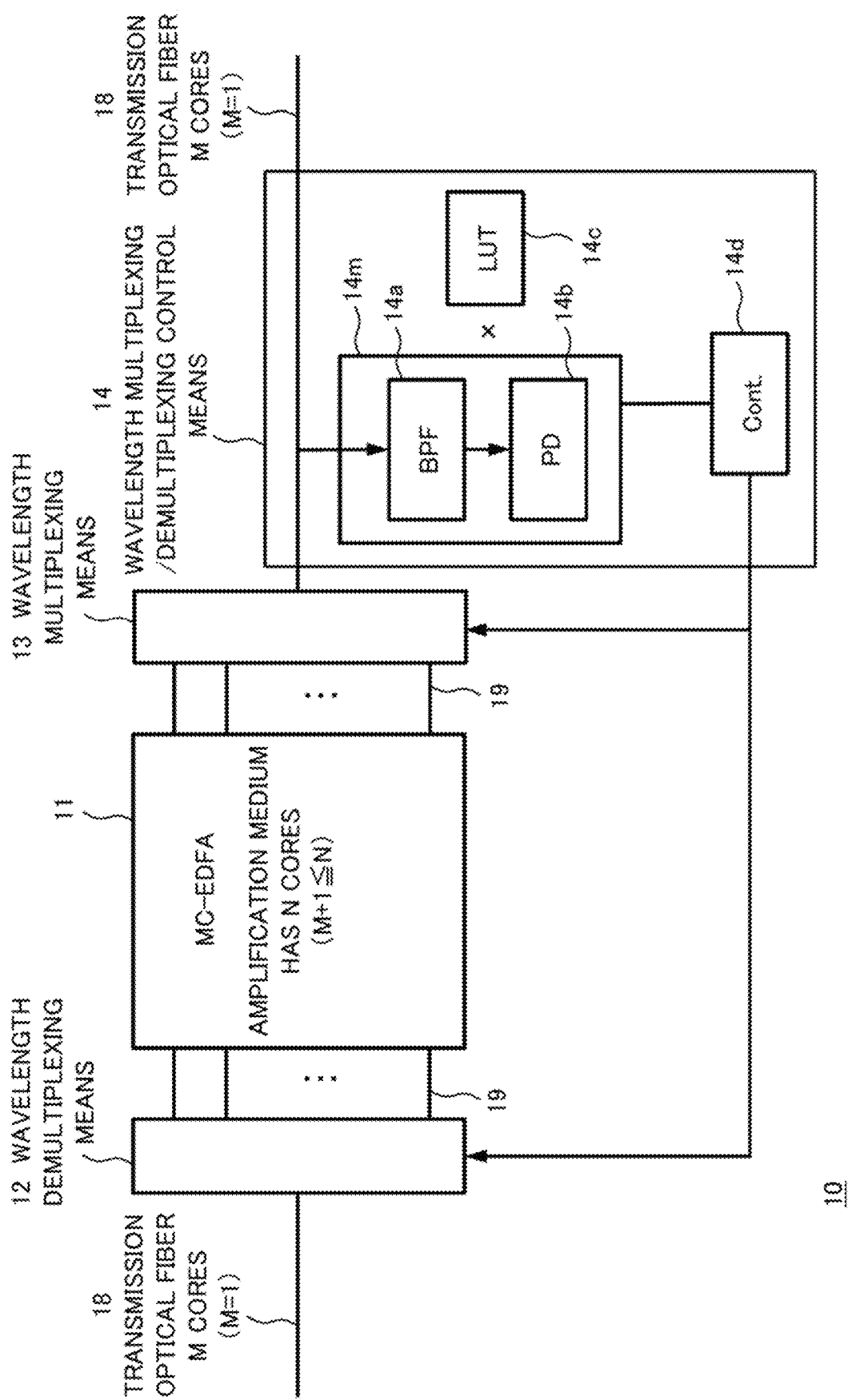
FIG. 1B is a configuration diagram for describing the optical amplifier according to the first example embodiment in which a more specific configuration of a wavelength multiplexing/demultiplexing control means 14 in FIG. 1A is illustrated.

The wavelength multiplexing/demultiplexing control means 14 of the optical amplifier 10 in FIG. 1A is configured by including, as illustrated in FIG. 1B, a monitoring means 14m, a look-up table (LUT) 14c, and a controller 14d that controls the wavelength demultiplexing means 12 and the wavelength multiplexing means 13. The monitoring means 14m includes a bandpass filter (BPF) 14a that extracts, from a WDM signal amplified by the optical amplifier 10 and emitted to the transmission optical fiber 18, an optical signal of a specific wavelength band and a photodetector (PD) 14b that detects optical intensity of a specific wavelength band extracted by the BPF 14a. The LUT 14c stores a specific wavelength band in a WDM signal amplified by the optical amplifier 10 and emitted to the transmission optical fiber 18 and "optical amplification efficiency" in the specific wavelength band in association with each other, as described later with reference to FIG. 4B. The optical amplification efficiency is a value unique to the optical amplifier 10. The controller 14d sets or modifies, by using a gain of an optical signal of a specific wavelength band extracted by the monitoring means 14m and optical amplification efficiency of a specific wavelength band stored in the LUT 14c and read from the LUT 14c, a multiplexing/demultiplexing ratio for a WDM signal of the wavelength demultiplexing means 12 and the wavelength multiplexing means 13.

Operation of Example Embodiment

According to each example embodiment of the present invention, for an optical amplifier in which a gain is likely to be different with respect to each wavelength, for example, from among WDM signals incident from the transmission optical fiber 18, a WDM signal or an optical signal of a wavelength band having a low gain and a WDM signal of a wavelength band other than the wavelength band having a low gain are demultiplexed by the wavelength demultiplexing means 12, and the WDM signal or the optical signal of the wavelength band having a low gain is amplified with a larger gain, multiplexed again by the wavelength multiplexing means 13, and emitted again as a WDM signal to the transmission optical fiber 18.

Herein, a way of thinking about demultiplexing of an optical signal of a specific wavelength band from a WDM signal to be amplified, which is incident from the transmission optical fiber 18 into the optical amplifier 10, amplification performed by the optical amplifier 10, and multiplexing of an amplified WDM signal is described. On the left side of FIG. 4A, one example of optical intensity with respect to a wavelength of a WDM signal to be amplified and a gain deviation of the optical amplifier 10 with respect to a wavelength is illustrated. Even when it is assumed that there is no variation of optical intensity with respect to a wavelength in a WDM signal to be amplified and optical intensity is constant, in a WDM signal after being amplified by the optical amplifier 10, a variation of optical intensity with respect to a wavelength occurs.

Figure 4A:
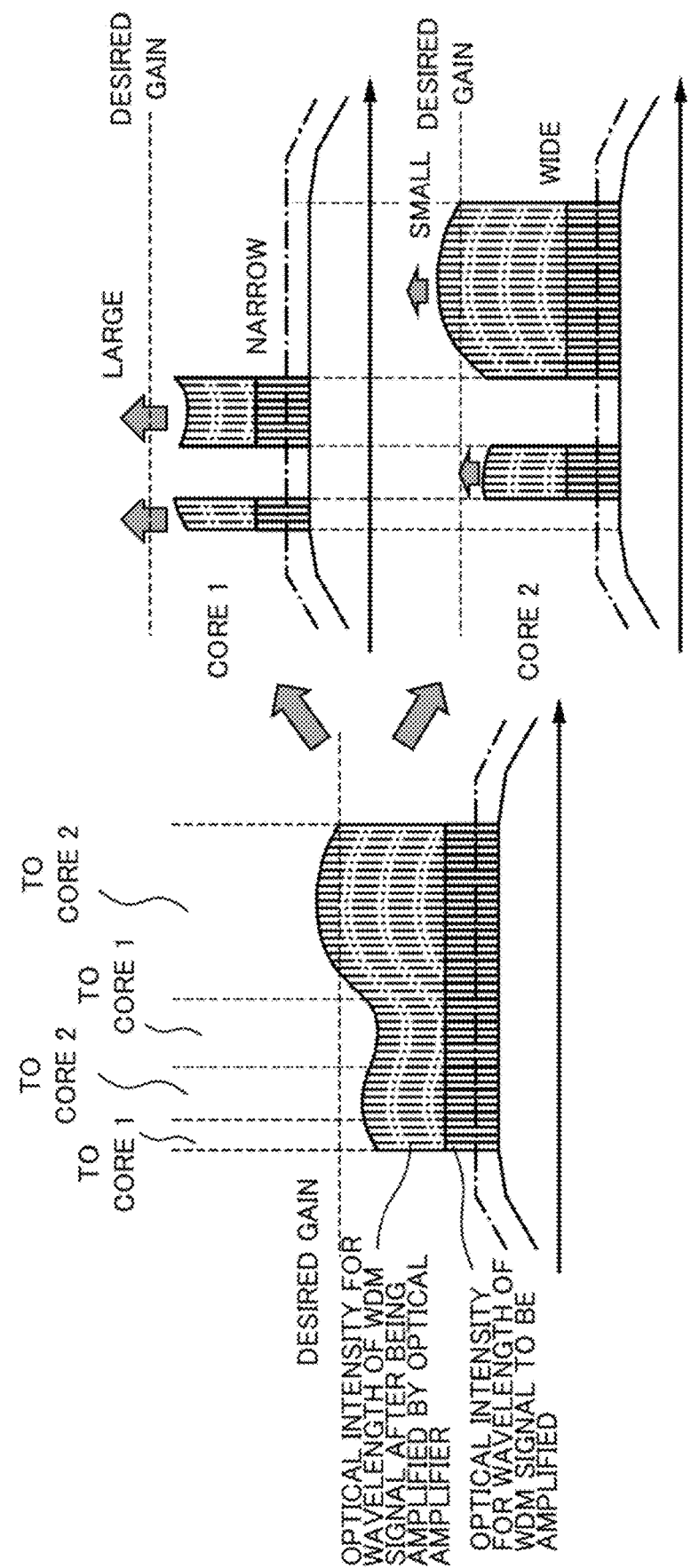
FIG. 4A is a waveform diagram for describing a way of thinking, according to the example embodiment of the present invention, about demultiplexing of an optical signal of a specific wavelength band from a WDM signal to be amplified, amplification based on an optical amplifier, and multiplexing of an amplified WDM signal.

In FIG. 4A, a dotted horizontal line indicates a desired gain expected for the optical amplifier 10. It is known that commonly, there is a gain variation with respect to a wavelength in an optical fiber amplifier. As an overall tendency, there is a tendency in that a gain is small for an optical signal of a short wavelength band and a gain is large for an optical signal of a long wavelength band. According to the present example embodiment, the controller 14d determines a multiplexing/demultiplexing ratio for demultiplexing a WDM signal amplified by the optical amplifier 10. When determining the multiplexing/demultiplexing ratio, reference is made to data of an optical signal of a specific wavelength band, in a WDM signal monitored by the monitoring means 14m, amplified by the optical amplifier 10, and emitted to the transmission optical fiber 18, and optical intensity of the optical signal and data of a specific wavelength band stored in the LUT 14c and read from the LUT 14c and optical amplification efficiency of the specific wavelength band. In addition, the controller 14d instructs the wavelength demultiplexing means 12 to preform demultiplexing, according to the above-described multiplexing/demultiplexing ratio, and the wavelength demultiplexing means 12 demultiplexes a WDM signal to be amplified into an optical signal of a wavelength band in which a gain of the optical amplifier 10 is large and an optical signal of a wavelength band in which a gain of the optical amplifier 10 is small.

The optical signal of a wavelength band having a large gain and the optical signal of a wavelength band having a small gain are separately supplied to a core 1 and a core 2 of the MC-FDFA 11 having N cores and optically amplified separately. FIG. 4A illustrates a case where an optical signal of a wavelength band in which a gain of the optical amplifier 10 is small is supplied to the core 1 of the MD-EDFA 11 and an optical signal of a wavelength band in which a gain of the optical amplifier 10 is large is supplied to the core 2 of the MD-EDFA 11. In the MC-EDFA 11, an optical signal of a wavelength band in which a gain of the optical amplifier 10 is small and a WDM signal of a wavelength band other than the wavelength band in which a gain of the optical amplifier 10 is small are amplified by separate cores in such a way as to exceed a desired gain in both signals. In the core 1, a large amplification rate is set and in the core 2, a relatively-small amplification rate is set, and then both cores each perform optical amplification.

Optical signals separately amplified by the core 1 and the core 2 are multiplexed by the wavelength multiplexing means 13 and emitted to the transmission optical fiber 18.

Figure 4B:
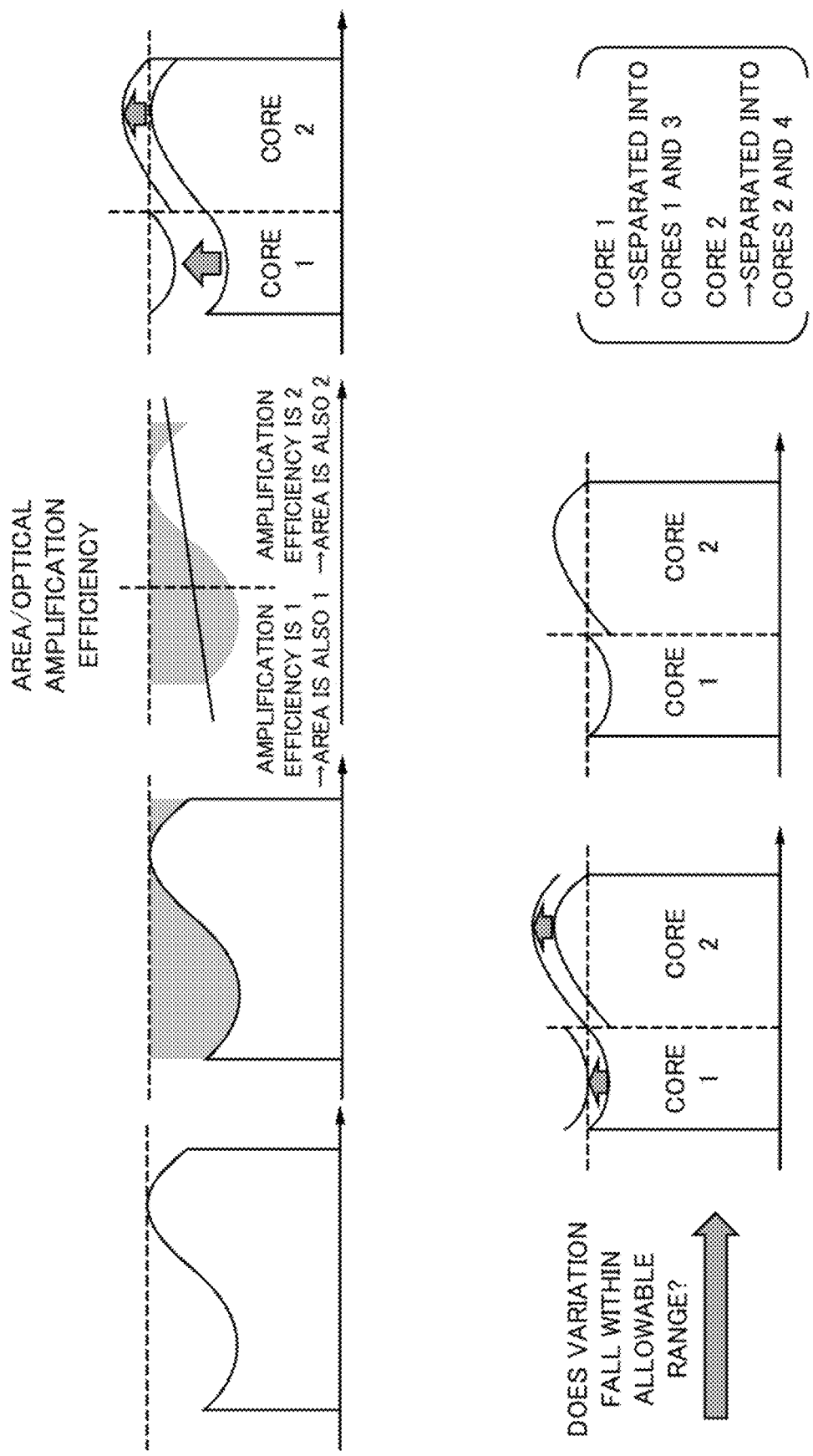
FIG. 4B is a waveform diagram for describing a way of thinking, according to the example embodiment of the present invention, about demultiplexing of an optical signal of a specific wavelength band from a WDM signal to be amplified, amplification performed by an optical amplifier, and multiplexing of an amplified WDM signal.

FIG. 4A illustrates a case where a WDM signal caused to be incident from the transmission optical fiber 18 into the optical amplifier 10 and amplified by the optical amplifier 10 is demultiplexed into two parts, but a demultiplexing number is not limited to two. A WDM signal may be demultiplexed, for example, into three or four parts. A way of thinking about the demultiplexing is further described with reference to FIG. 4B. On the upper right side of FIG. 4B, characteristics of a gain deviation with respect to a wavelength of an optical amplifier are illustrated. In FIG. 4B, a horizontal axis indicates a wavelength of a WDM signal to be amplified, and a vertical axis indicates optical intensity with respect to a wavelength. A dotted horizontal line indicates a desired gain expected for the optical amplifier. Attention is paid to an area of a shaded portion between gain characteristics and a desired gain. Herein, "optical amplification efficiency" is defined as (an output signal light amount from an EDF−an input signal light amount to the EDF)/an excitation light amount incident into the EDF×100.

As a scale in which optical amplification efficiency of an optical amplifier and an area of an illustrated shaded portion are combined, (area/optical amplification efficiency) is assumed. In a wavelength band of a WDM signal in which the scale is the same, a WDM signal is demultiplexed. For example, demultiplexing is performed into an optical signal of a wavelength band in which an area indicates 1 and optical amplification efficiency indicates 1 and an optical signal of a wavelength band in which an area indicates 2 and optical amplification efficiency indicates 2. In the illustrated case of FIG. 4B, an optical signal of a short wavelength band of a WDM signal is an optical signal of a wavelength band in which an area indicates 1 and optical amplification efficiency indicates 1, and an optical signal of a long wavelength band of a WDM signal is an optical signal of a wavelength band in which an area indicates 2 and optical amplification efficiency indicates 2. The optical signal of a wavelength band in which an area indicates 1 and optical amplification efficiency indicates 1 is supplied to the core 1 of the MC-EDFA 11 and the optical signal of a wavelength band in which an area indicates 2 and optical amplification efficiency indicates 2 is supplied to the core 2 of the MC-EDFA 11, and both optical signals are amplified based on a clad collective excitation method, further multiplexed by the wavelength multiplexing means 13 and emitted to the transmission optical fiber 18.

The wavelength multiplexing/demultiplexing control means 14 confirms whether a gain variation of an optical signal of a wavelength band of a WDM signal amplified by the core 1 and a gain variation of an optical signal of a wavelength band of a WDM signal amplified by the core 2 each fall within an allowable range. When a gain variation does not fall within the allowable range, it is conceivable that the optical signal of a wavelength band of a WDM signal amplified by the core 1 is further demultiplexed and thereby, demultiplexed, for example, into the core 1 and a core 3 being a core different from the core 1 and the core 2 or the optical signal of a wavelength band of a WDM signal amplified by the core 2 is further demultiplexed and thereby, demultiplexed, for example, into the core 2 and a core 4 being a core different from the core 1 to the core 3.

In a case of a multi-core optical amplifier based on a clad collective excitation method as described according to the present example embodiment, as a wavelength filling rate of a WDM signal is smaller, an amplification rate of an optical amplifier increases, and as a wavelength filling rate of a WDM signal is larger, an amplification rate of an optical amplifier decreases. Note that, "the wavelength filling rate" is defined as a ratio of a wavelength band of a WDM signal caused to be incident into a certain core and amplified to a WDM signal of the widest wavelength band amplified by an optical amplifier. In demultiplexing illustrated in FIG. 4A, in consideration of such characteristics of an optical amplifier, a narrow range as a wavelength band in which a gain of the optical amplifier 10 is small is demultiplexed from a wavelength band in which a gain of the optical amplifier 10 is large. Thereby, a large amplification rate is expected for an optical signal of a wavelength band in which a gain of the optical amplifier 10 is small and effective usage of excitation light may be achieved.

Advantageous Effects of Example Embodiment

According to the present example embodiment, for an optical amplifier in which a gain is likely to be different with respect to each wavelength, demultiplexing is performed, for example, into an optical signal of a wavelength band having large optical amplification efficiency and an optical signal of a wavelength band having small optical amplification efficiency, the demultiplexed optical signals are amplified by separate cores of the MC-EDFA 11, and thereby amplification can be performed with an appropriate amplification rate in such a way as to be not excessively large or small for each wavelength band. Thereby, it is possible to achieve a multi-core optical fiber amplifier, a multi-core optical fiber amplifier controlling method, and an optical transmission system capable of reducing wavelength dependency of a signal gain while increasing usage efficiency of a supplied-power resource. Compared with the optical amplifier in Background Art, power consumption in an optical amplifier can be reduced.

According to the present example embodiment, it has been described that the wavelength multiplexing/demultiplexing control means 14 monitors an amplified WDM signal, and in particular, monitors an amplification rate of a specific wavelength band, but a target monitored by the multiplexing/demultiplexing control means 14 is not limited to an amplification rate itself of a specific wavelength band. The wavelength multiplexing/demultiplexing control means 14 may be configured in such a way as to monitor a scale associated with an amplification rate of a specific wavelength band and control, according to a monitoring result, demultiplexing performed by the wavelength demultiplexing means 12 and multiplexing performed by the wavelength multiplexing means 13. Herein, as the scale associated with an amplification rate, a noise figure (NF), a generalized optical signal to noise ratio (G-OSNR), or the like to be described later is conceivable.

Modified Example of First Example Embodiment

The above-described wavelength multiplexing/demultiplexing control means 14 of the optical amplifier 10 in FIG. 1A monitors a WDM signal multiplexed by the wavelength multiplexing means 13 and emitted to the transmission optical fiber 18 and supplies a control signal according to a monitoring result to the wavelength demultiplexing means 12 and the wavelength multiplexing means 13, but it is also conceivable that the wavelength multiplexing/demultiplexing control means 14 is configured in such a way as to also supply a control signal according to the monitoring result to an excitation light source used for clad collective excitation of the MC-EDFA 11. An optical fiber amplifier based on a clad collective excitation method propagates excitation light from a single excitation light source into a clad and collectively amplifies signal light of a plurality of cores in the clad.

FIG. 1C is a configuration diagram for describing a modified example of the optical amplifier according to the first example embodiment of the present invention. An optical amplifier 10B in FIG. 1C is different from the configuration of the optical amplifier 10 in FIG. 1A in that as one example of a clad collective excitation means, the MC-EDFA 11 further includes a laser diode (LD) 15 as an excitation light source and a control signal is also supplied from the wavelength multiplexing/demultiplexing control means 14 to the LD 15. In the optical amplifier 10B in FIG. 1C, the wavelength multiplexing/demultiplexing control means 14 performs control in such a way as to monitor a WDM signal multiplexed by the wavelength multiplexing means 13 and emitted to the transmission optical fiber 18, sets or modifies, according to a monitoring result, a multiplexing/demultiplexing ratio for a WDM signal of the wavelength demultiplexing means 12 and the wavelength multiplexing means 13, and sets or modifies a light amount of the LD 15 of the MC-EDFA 11.

As a method of controlling the optical amplifier in FIG. 1C, adjustment of output of the LD 15 is described. FIG. 1D is a flowchart for describing an optical amplifier controlling method. In wavelength characteristics of a WDM signal incident into the MC-EDFA 11, first, output of the LD 15 is adjusted in such a way that a maximum gain is a desired gain expected for the optical amplifier 10B (step S1). Next, the wavelength multiplexing/demultiplexing control means 14 monitors a wavelength having an insufficient gain (step S2). Next, based on the way of thinking illustrated in FIG. 4B, a separation band in which "area/optical amplification efficiency in the band" is equal is calculated (step S3). Herein, it is assumed that "the separation band" indicates a wavelength or a wavelength band of a width of several nm of a boundary of a plurality of wavelength bands demultiplexed according to the method of the present example embodiment. In the illustration of FIG. 4B, it is assumed that a wavelength or a wavelength band illustrated with a dotted line between "a core 1" and "a core 2" is indicated. Next, according to the calculation result in step S3, the wavelength demultiplexing means 12 demultiplexes an optical signal of a specific wavelength band and causes the demultiplexed optical signals to enter different cores (step S4). Next, output of the LD 15 is adjusted in such a way that the maximum gain is a desired gain expected for the optical amplifier 10B (Step S5). As a result of the demultiplexing in step S4, a gain for each wavelength band of the MC-EDFA 11 may be changed, and therefore in step S5, adjustment of output of the LD 15 (readjustment of LD 15 output) is performed. Next, it is determined whether a gain variation falls within an allowable range (step S6). When the gain variation falls within the allowable range (yes in step S6), output of the LD 15 is adjusted in such a way that among wavelength characteristics, a minimum gain is a desired gain (step S7), and the adjustment is terminated. When the gain variation does not fall within the allowable range (no in step S6), a return is made to step S2 and adjustment is continued.

Figure 1E:
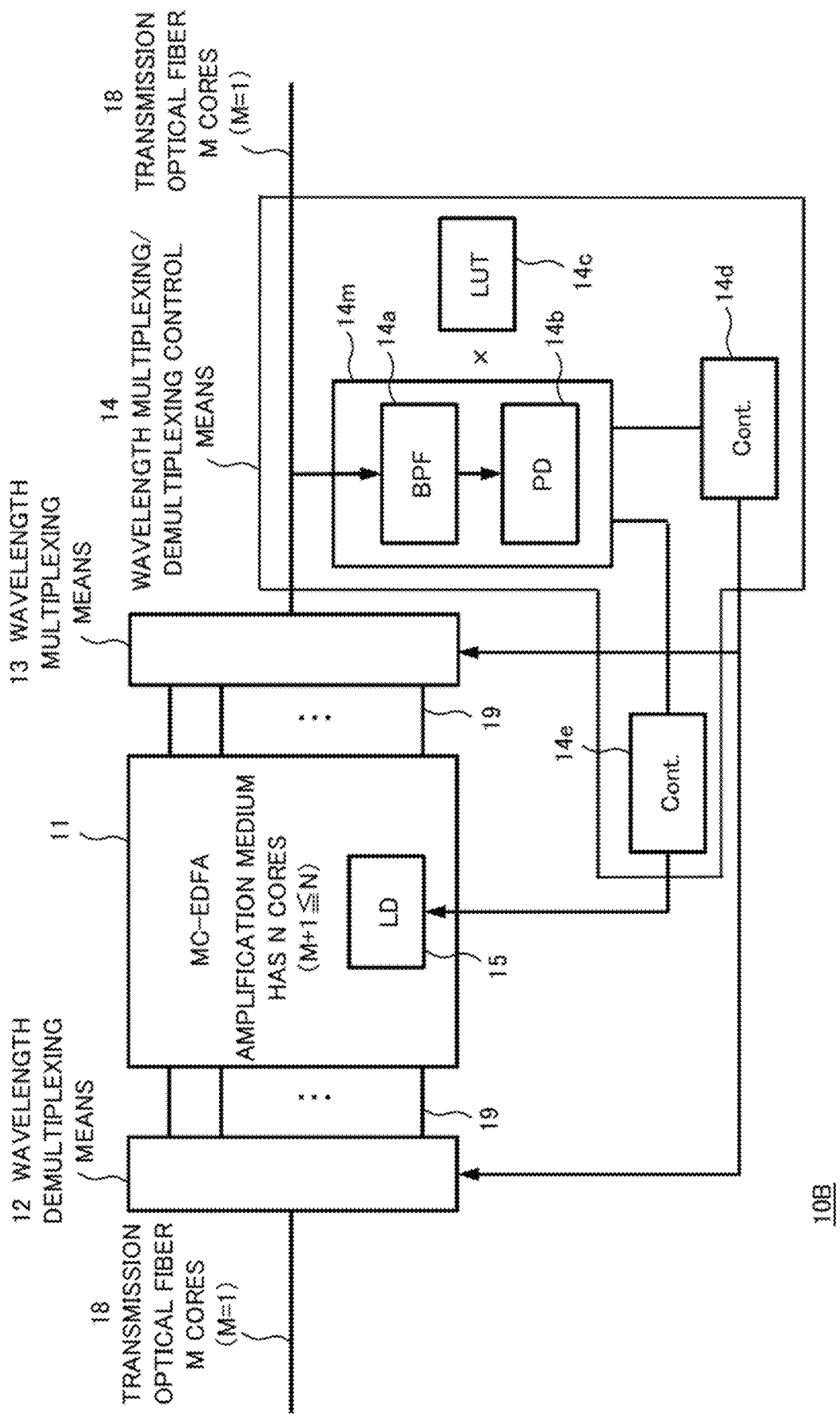
FIG. 1E is a configuration diagram for describing a modified example of the optical amplifier according to the first example embodiment in which a more specific configuration of a wavelength multiplexing/demultiplexing control means 14 in FIG. 1C is illustrated.

The wavelength multiplexing/demultiplexing control means 14 of the optical amplifier 10B in FIG. 1C is configured by including, as illustrated in FIG. 1E, a monitoring means 14m, a look-up table (LUT) 14c, a controller 14d that controls the wavelength demultiplexing means 12 and the wavelength multiplexing means 13, and a controller 14e that controls the LD 15. The monitoring means 14m includes a bandpass filter (BPF) 14a that extracts an optical signal of a specific wavelength band from a WDM signal amplified by the optical amplifier 10 and emitted to the transmission optical fiber 18 and a photodetector (PD) 14b that detects optical intensity of the specific wavelength band extracted by the BPF 14a. It is assumed that a pair of the BPF 14a and the PD 14b is used for monitoring a gain for each specific wavelength band in a WDM signal amplified by the optical amplifier 10 and a plurality of pairs are disposed in a wavelength axis direction. The LUT 14c stores "optical amplification efficiency" of the MC-EDFA 11. The controller 14d sets or modifies, by using a gain of an optical signal of a specific wavelength band extracted by the monitoring means 14m and optical amplification efficiency of a specific wavelength band stored in the LUT 14c and read from the LUT 14c, a multiplexing/demultiplexing ratio for a WDM signal of the wavelength demultiplexing means 12 and the wavelength multiplexing means 13. The controller 14d controls a light amount of the LD 15, based on a gain of an optical signal of a specific wavelength band extracted by the monitoring means 14m and optical amplification efficiency of a specific wavelength band stored in the LUT 14c and read from the LUT 14c.

Adjustment of output of the LD 15 performed by the wavelength multiplexing/demultiplexing control means 14 illustrated in FIG. 1E is described. First, with regard to optical signals of all wavelength bands included in a WDM signal incident into the MC-EDFA 11, optical intensity for a wavelength as an aggregate of optical signals of a specific wavelength band is detected and thereby, a total gain of the WDM signal is monitored. Specifically, monitoring is performed by using the BPF with respect to each fixed wavelength interval. Next, as in step S1 of FIG. 1D, in wavelength characteristics, first, output of the LD 15 is adjusted in such a way that a maximum gain is a desired gain expected for the optical amplifier 10B. Next, as in step S2 of FIG. 1D, a wavelength having an insufficient gain is monitored. Herein, monitoring is performed by using the BPF with respect to each fixed wavelength interval. Next, as in step S3 of FIG. 1D, a separation band in which an "area/optical amplification efficiency in the band" is equal is calculated. Optical amplification efficiency of the MC-EDFA 11 is determined based on an EDF length and previously stored. Next, as in step S4 of FIG. 1D, according to the calculation result in step S3, the wavelength demultiplexing means 12 demultiplexes an optical signal of a specific wavelength band and causes the demultiplexed optical signals to enter different cores. As in step S5 of FIG. 1D, output of the LD 15 is adjusted in such a way that a maximum gain is a desired gain expected for the optical amplifier 10B. Next, as in step S6 of FIG. 1D, it is determined whether a gain variation falls within an allowable range. When the gain variation falls within the allowable range, in wavelength characteristics, output of the LD 15 is adjusted in such a way that a minimum gain is a desired gain and the adjustment is terminated. As in no in step S6 of FIG. 1D, when the gain variation does not fall within the allowable range, a return is made as in step S1 of FIG. 1D and the adjustment is continued.

According to the modified example of the optical amplifier according to the first example embodiment of the present invention illustrated in FIG. 1C, control is performed in such a way that a WDM signal multiplexed by the wavelength multiplexing means 13 and emitted to the transmission optical fiber 18 is monitored and according to a monitoring result, a multiplexing/demultiplexing ratio for a WDM signal of the wavelength demultiplexing means 12 and the wavelength multiplexing means 13 is set or modified, and a light amount of the LD 15 of the MC-EDFA 11 is set or modified. Thereby, it is possible to perform demultiplexing, for example, into an optical signal of a wavelength band having large optical amplification efficiency and an optical signal of a wavelength band having small optical amplification efficiency, amplify the demultiplexed optical signals by using separate cores, and adjust, by using a light amount of the LD 15, an excitation effect based on excitation light from the LD 15 reaching each core at that time. As a result, while a gain deviation for each wavelength based on the MC-EDFA 11 is further decreased, a light amount for clad collective excitation is optimized and thereby, power consumption may be further reduced.

Second Example Embodiment

Next, an optical amplifier, an optical amplifier controlling method, and an optical transmission system according to a second example embodiment of the present invention are described. FIG. 2A is a configuration diagram for describing the optical amplifier according to the second example embodiment of the present invention. According to the present example embodiment, as the optical amplifier, a multi-core optical fiber amplifier similar to the first example embodiment is assumed. However, while according to the first example embodiment, a multi-core optical fiber amplifier into which a wavelength division multiplexing (WDM) signal is incident from a transmission optical fiber having one core is assumed, according to the present example embodiment, description is made by assuming, as an optical amplifier, a multi-core optical fiber amplifier having N cores (herein, N≥M+1) into which a WDM signal is incident from a transmission optical fiber having M cores (herein, M≥1). As understood from example embodiments described below, an optical amplifier applied with the present invention is not limited to a configuration according to the present example embodiment.

Configuration of Example Embodiment

An optical amplifier 20 in FIG. 2A is used for the optical transmission system illustrated in FIG. 6, similarly to the first example embodiment. An optical transmission system 100 in FIG. 6 is configured by including a transmission optical fiber 102 connecting a terminal 101a and a terminal 101b and a repeater 103 inserted in the transmission optical fiber 102. Commonly, a plurality of repeaters 103 are inserted in one transmission optical fiber 102. The optical amplifier 20 in FIG. 2A is provided for one repeater 103 in FIG. 6 and amplifies an optical signal propagating through the transmission optical fiber 102. Commonly, a transmission optical fiber of an optical transmission system includes a multi-core. According to the present example embodiment, description is made, by assuming an optical amplifier inserted in such a multi-core transmission optical fiber.

The optical amplifier 20 in FIG. 2A includes a transmission optical fiber 28 having M cores (M≥1) and a multi-core erbium doped optical fiber amplifier (MC-EDFA) 21 inserted in the transmission optical fiber 28. The MC-EDFA 21 is, similarly to the first example embodiment, a multi-core optical fiber amplifier having N cores (herein, N≥M+1) as an amplification medium and amplifies a WDM signal incident from the transmission optical fiber 28 having M cores. The MC-EDFA 21 is configured by disposing N cores in one clad.

The optical amplifier 20 in FIG. 2A further includes a wavelength multiplexing/demultiplexing means for a WDM signal incident from the transmission optical fiber 28. The wavelength multiplexing/demultiplexing means for a WDM signal includes a wavelength demultiplexing means 22 that performs demultiplexing according to a control signal and a wavelength multiplexing means 23 that multiplexes, according to a control signal, a plurality of optical signals demultiplexed by the wavelength demultiplexing means 22 and separately amplified by the MC-EDFA 21. The wavelength demultiplexing means 22 and the wavelength multiplexing means 23 may be configured by using, for example, an array waveguide diffraction grating (AWG) or a wavelength selective switch (WSS).

The wavelength demultiplexing means 22 and the MC-EDFA 21 are connected by N single-mode fibers 29 (SM fibers 29), and the MC-EDFA 21 and the wavelength multiplexing means 23 are connected by N single-mode fibers 29 (SM fibers 29). The optical amplifier 20 in FIG. 2A further includes a wavelength multiplexing/demultiplexing control means 24 that monitors a WDM signal multiplexed by the wavelength multiplexing means 23 and emitted to the transmission optical fiber 28 and supplies a control signal according to a monitoring result to the wavelength demultiplexing means 22 and the wavelength multiplexing means 23.

The wavelength multiplexing/demultiplexing control means 24 monitors an amplification rate of a specific wavelength band. Alternatively, the wavelength multiplexing/demultiplexing control means 24 monitors optical amplification efficiency and a gain variation of a specific wavelength band. Alternatively, the wavelength multiplexing/demultiplexing control means 24 monitors optical amplification efficiency and a noise figure (NF) variation of a specific wavelength band. Alternatively, the wavelength multiplexing/demultiplexing control means 24 monitors optical amplification efficiency and a generalized optical signal to noise ratio (G-OSNR) variation of a specific wavelength band.

Figure 2B:
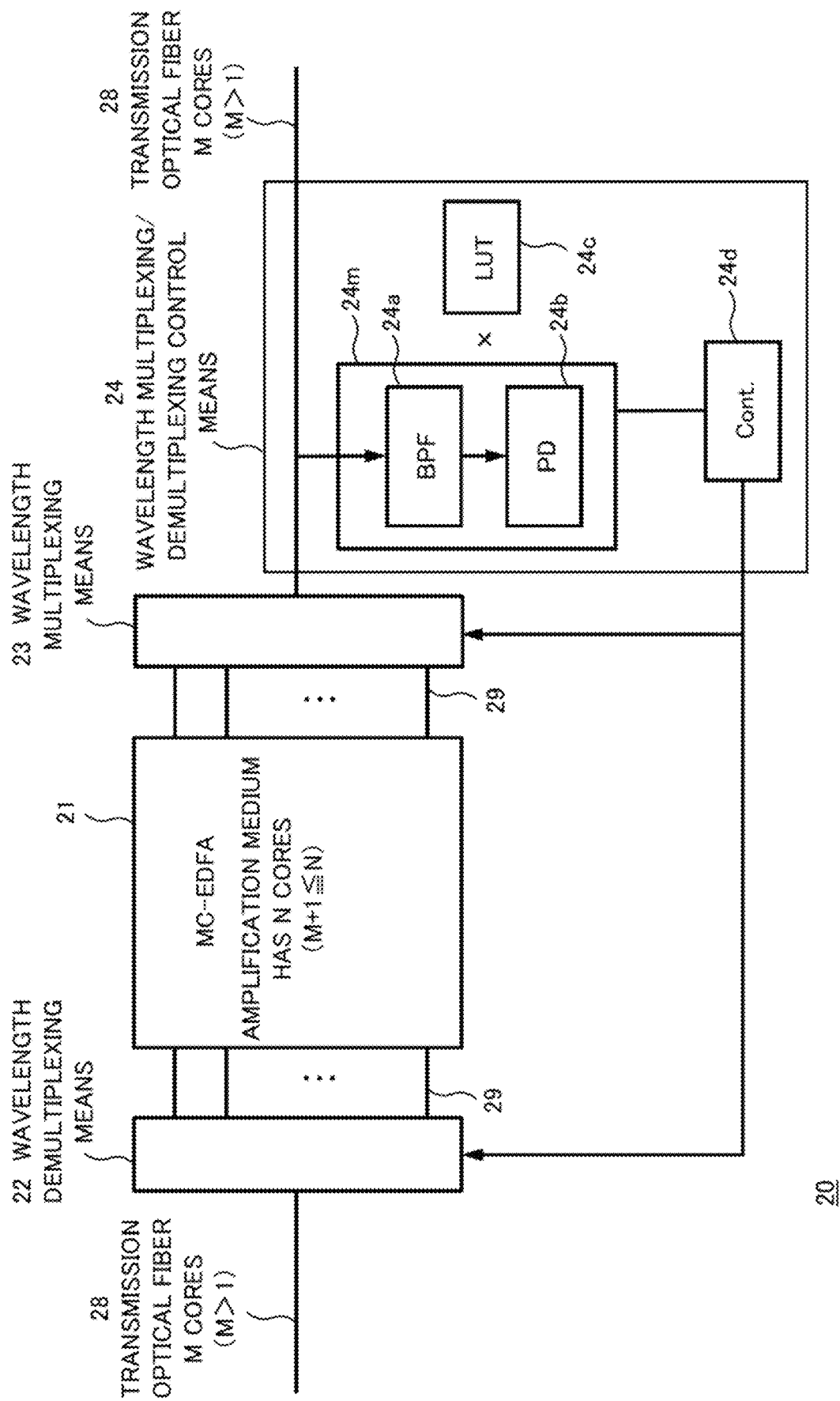
FIG. 2B is a configuration diagram for describing the optical amplifier according to the first example embodiment in which a more specific configuration of a wavelength multiplexing/demultiplexing control means 24 in FIG. 2A is illustrated.

The wavelength multiplexing/demultiplexing control means 24 of the optical amplifier 20 in FIG. 2A is configured by including, as illustrated in FIG. 2B, a monitoring means 24m, a look-up table (LUT) 24c, and a controller 24d that controls the wavelength demultiplexing means 22 and the wavelength multiplexing means 23. The monitoring means 24m includes a bandpass filter (BPF) 24a that extracts, from a WDM signal amplified by the optical amplifier 20 and emitted to the transmission optical fiber 28, an optical signal of a specific wavelength band and a photodetector (PD) 24b that detects optical intensity of the specific wavelength band extracted by the BPF 24a. The LUT 24c stores "optical amplification efficiency" of the MC-EDFA 21. The controller 24d sets or modifies, by using a gain of an optical signal of a specific wavelength band extracted by the monitoring means 24m and optical amplification efficiency of a specific wavelength band stored in the LUT 14c and read from the LUT 24c, a multiplexing/demultiplexing ratio for a WDM signal of the wavelength demultiplexing means 22 and the wavelength multiplexing means 23.

According to each example embodiment of the present invention, for an optical amplifier in which a gain is likely to be different with respect to each wavelength, for example, from among WDM signals incident from the transmission optical fiber 28, a WDM signal or an optical signal of a wavelength band having a low gain and a WDM signal of a wavelength band other than the former wavelength band are demultiplexed by the wavelength demultiplexing means 22, and the WDM signal or the optical signal of a wavelength band having a low gain is amplified with a larger gain, multiplexed by the wavelength multiplexing means 23, and emitted again as a WDM signal to the transmission optical fiber 28. A way of thinking about multiplexing and a way of thinking about amplification are similar to the description according to the above-described first example embodiment.

Advantageous Effects of Example Embodiment

According to the present example embodiment, for an optical amplifier in which a gain is likely to be different with respect to each wavelength, demultiplexing is performed, for example, into an optical signal of a wavelength band having large optical amplification efficiency and an optical signal of a wavelength band having small optical amplification efficiency, the demultiplexed optical signals are amplified by separate cores of the MC-EDFA 21, and thereby amplification can be performed with an appropriate amplification rate in such a way as to be not excessively large or small for each wavelength band. Thereby, it is possible to achieve a multi-core optical fiber amplifier, a multi-core optical fiber amplifier controlling method, and an optical transmission system capable of reducing wavelength dependency of a signal gain while usage efficiency of a supplied-power resource is increased. Compared with the optical amplifier in Background Art, power consumption in an optical amplifier can be reduced.

According to the present example embodiment, it has been described that the wavelength multiplexing/demultiplexing control means 24 monitors an amplified WDM signal, in particular, monitors an amplification rate of a specific wavelength band, and the like, but a target monitored by the wavelength multiplexing/demultiplexing control means 24 is not limited to an amplification rate itself of a specific wavelength band. The wavelength multiplexing/demultiplexing control means 24 may be configured in such a way as to monitor a scale associated with an amplification rate of a specific wavelength band and control, according to a monitoring result, demultiplexing performed by the wavelength demultiplexing means 22 and multiplexing performed by the wavelength multiplexing means 23.

Modified Example of Second Example Embodiment

The above-described wavelength multiplexing/demultiplexing control means 24 of the optical amplifier 20 in FIG.

2A monitors a WDM signal multiplexed by the wavelength multiplexing means 23 and emitted to the transmission optical fiber 28 and supplies a control signal according to a monitoring result to the wavelength demultiplexing means 22 and the wavelength multiplexing means 23, but it is conceivable that the wavelength multiplexing/demultiplexing control means 24 is configured in such a way as to supply the control signal according to a monitoring result to an excitation light source used for clad collective excitation of the MC-EDFA 21. An optical fiber amplifier based on a clad collective excitation method propagates excitation light from a single excitation light source into a clad and collectively amplifies signal light of a plurality of cores in the clad.

FIG. 2C is a configuration diagram for describing a modified example of the optical amplifier according to the second example embodiment of the present invention. An optical amplifier 20B in FIG. 2C is different from the configuration of the optical amplifier 20 in FIG. 2A in that as one example of a clad collective excitation means, the MC-EDFA 21 further includes a laser diode (LD) 25 as an excitation light source and a control signal is also supplied from the wavelength multiplexing/demultiplexing control means 24 to the LD 25. In the optical amplifier 20B in FIG. 2C, the wavelength multiplexing/demultiplexing control means 24 performs control in such a way as to monitor a WDM signal multiplexed by the wavelength multiplexing means 23 and emitted to the transmission optical fiber 28, sets or modifies, according to a monitoring result, a multiplexing/demultiplexing ratio for a WDM signal of the wavelength demultiplexing means 22 and the wavelength multiplexing means 23, and sets or modifies a light amount of the LD 25 of the MC-EDFA 21.

Figure 2D:
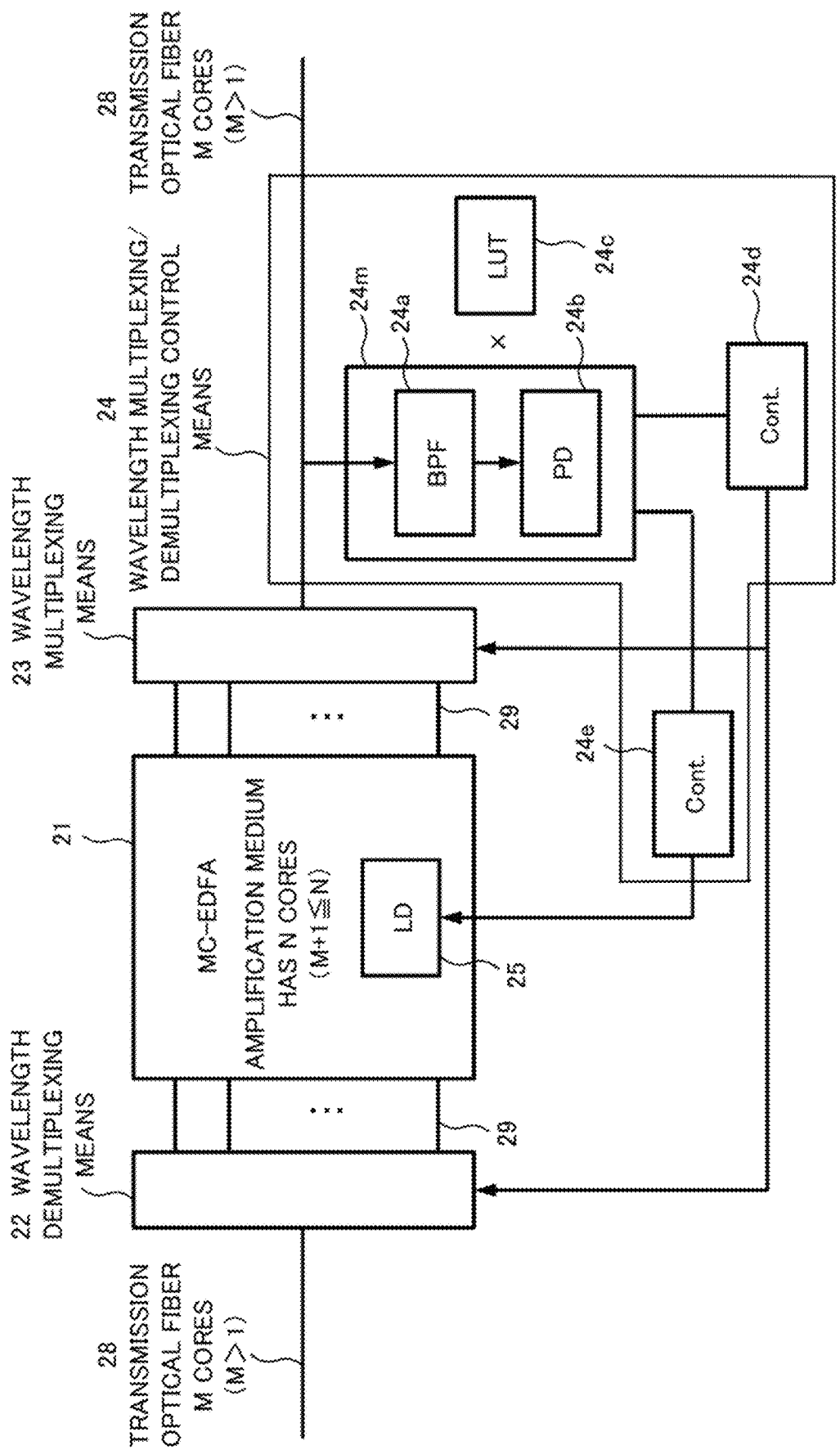
FIG. 2D is a configuration diagram for describing a modified example of the optical amplifier according to the first example embodiment in which a more specific configuration of a wavelength multiplexing/demultiplexing control means 24 in FIG. 2C is illustrated.

The wavelength multiplexing/demultiplexing control means 24 of the optical amplifier 20B in FIG. 2C is configured by including, as illustrated in FIG. 2D, a monitoring means 24m, a look-up table (LUT) 24c, a controller 24d that controls the wavelength demultiplexing means 22 and the wavelength multiplexing means 23, and a controller 24e that controls the LD 25. The monitoring means 24m includes a bandpass filter (BPF) 24a that extracts an optical signal of a specific wavelength band from a WDM signal amplified by the optical amplifier 20 and emitted to the transmission optical fiber 28 and a photodetector (PD) 24b that detects optical intensity of the specific wavelength band extracted by the BPF 24a. The LUT 24c stores "optical amplification efficiency" of the MC-EDFA 21. The controller 24d sets or modifies, by using a gain of an optical signal of a specific wavelength band extracted by the monitoring means 24m and optical amplification efficiency of a specific wavelength band stored in the LUT 24c and read from the LUT 24c, a multiplexing/demultiplexing ratio for a WDM signal of the wavelength demultiplexing means 22 and the wavelength multiplexing means 23. The controller 24d controls a light amount of the LD 25, based on the gain of an optical signal of a specific wavelength band extracted by the monitoring means 24m and the optical amplification efficiency of a specific wavelength band stored in the LUT 24c and read from the LUT 24c.

According to the modified example of the optical amplifier according to the second example embodiment of the present invention illustrated in FIG. 2C, control is performed in such a way that a WDM signal multiplexed by the wavelength multiplexing means 23 and emitted to the transmission optical fiber 28 is monitored and according to a monitoring result, a multiplexing/demultiplexing ratio for a WDM signal of the wavelength demultiplexing means 22 and the wavelength multiplexing means 23 is set or modified and a light amount of the LD 25 of the MC-EDFA 21 is set or modified. Thereby, while a gain deviation for each wavelength based on the MC-EDFA 21 is further decreased, a light amount for clad collective excitation is optimized and thereby, power consumption can be further reduced.

Third Example Embodiment

Next, an optical amplifier, an optical amplifier controlling method, and an optical transmission system according to a third example embodiment of the present invention are described. According to the above-described first example embodiment and second example embodiment, description has been made for a case where for a transmission optical fiber having M cores, a multi-core optical fiber amplifier having N cores (herein, N≥M+1) as an amplification medium is used and the present invention is applied, but the present invention is not limited to the configuration. Instead of a multi-core optical fiber amplifier, for example, a single-core optical fiber amplifier is used, and thereby the present invention can be achieved.

FIG. 3A is a configuration diagram for describing the optical amplifier according to the third example embodiment of the present invention. According to the present example embodiment, description is made, by assuming, as an optical amplifier, N (herein, N≥M+1) single-core optical fiber amplifiers into which a wavelength division multiplexing (WDM) signal is incident from a transmission optical fiber having M cores (herein, M=1).

An optical amplifier 30 in FIG. 3A is used for the optical transmission system illustrated in FIG. 6, similarly to the first example embodiment and the second example embodiment. An optical transmission system 100 illustrated in FIG. 6 is configured by including a transmission optical fiber 102 connecting a terminal 101a and a terminal 101b and a repeater 103 inserted in the transmission optical fiber 102. Commonly, a plurality of repeaters 103 are inserted in one transmission optical fiber 102. The optical amplifier 30 in FIG. 3A is provided for one repeater 103 in FIG. 6 and amplifies an optical signal propagating through the transmission optical fiber 102.

The optical amplifier 30 in FIG. 3A includes a transmission optical fiber 38 having M cores (herein, M=1) and N (herein, N≥M+1) single-core erbium doped optical fiber amplifiers (–EDFAs) 31 inserted in the transmission optical fiber 38. Each single-core EDFA 31 according to the present example embodiment is a single-core optical fiber amplifier having one core as an amplification medium and amplifies a WDM signal or an optical signal incident from the transmission optical fiber 38 having M cores. The single-core EDFAs 31 is configured by disposing one core in one clad.

The optical amplifier 30 in FIG. 3A further includes a multiplexing/demultiplexing means for a WDM signal incident from the transmission optical fiber 38. The multiplexing/demultiplexing means for a WDM signal includes a wavelength demultiplexing means 32 that performs demultiplexing according to a control signal and a wavelength multiplexing means 33 that multiplexes, according to a control signal, a plurality of optical signals demultiplexed by the wavelength demultiplexing means 32 and separately amplified by a plurality of single-core EDFAs 31. The wavelength demultiplexing means 32 and the wavelength multiplexing means 33 may be configured by using, for example, an array waveguide diffraction grating (AWG) or a wavelength selective switch (WSS).

Note that, the wavelength demultiplexing means 32 and the N single-core EDFAs 31 are connected by N single-mode fibers 39 (SM fibers 39), and the N single-mode EDFAs 31 and the wavelength multiplexing means 33 are connected by N single-mode fibers 39 (SM fibers 39). The optical amplifier 30 in FIG. 3A further includes a wavelength multiplexing/demultiplexing control means 34 that monitors a WDM signal multiplexed by the wavelength multiplexing means 33 and emitted to the transmission optical fiber 38 and supplies a control signal according to a monitoring result to the wavelength demultiplexing means 32 and the wavelength multiplexing means 33.

The wavelength multiplexing/demultiplexing control means 34 monitors an amplification rate of a specific wavelength band. Alternatively, the wavelength multiplexing/demultiplexing control means 34 monitors optical amplification efficiency and a gain variation of a specific wavelength band. Alternatively, the wavelength multiplexing/demultiplexing control means 34 monitors optical amplification efficiency and a noise figure (NF) variation of a specific wavelength band. Alternatively, the wavelength multiplexing/demultiplexing control means 34 monitors optical amplification efficiency and a generalized optical signal to noise ratio (G-OSNR) variation of a specific wavelength band.

Figure 3B:
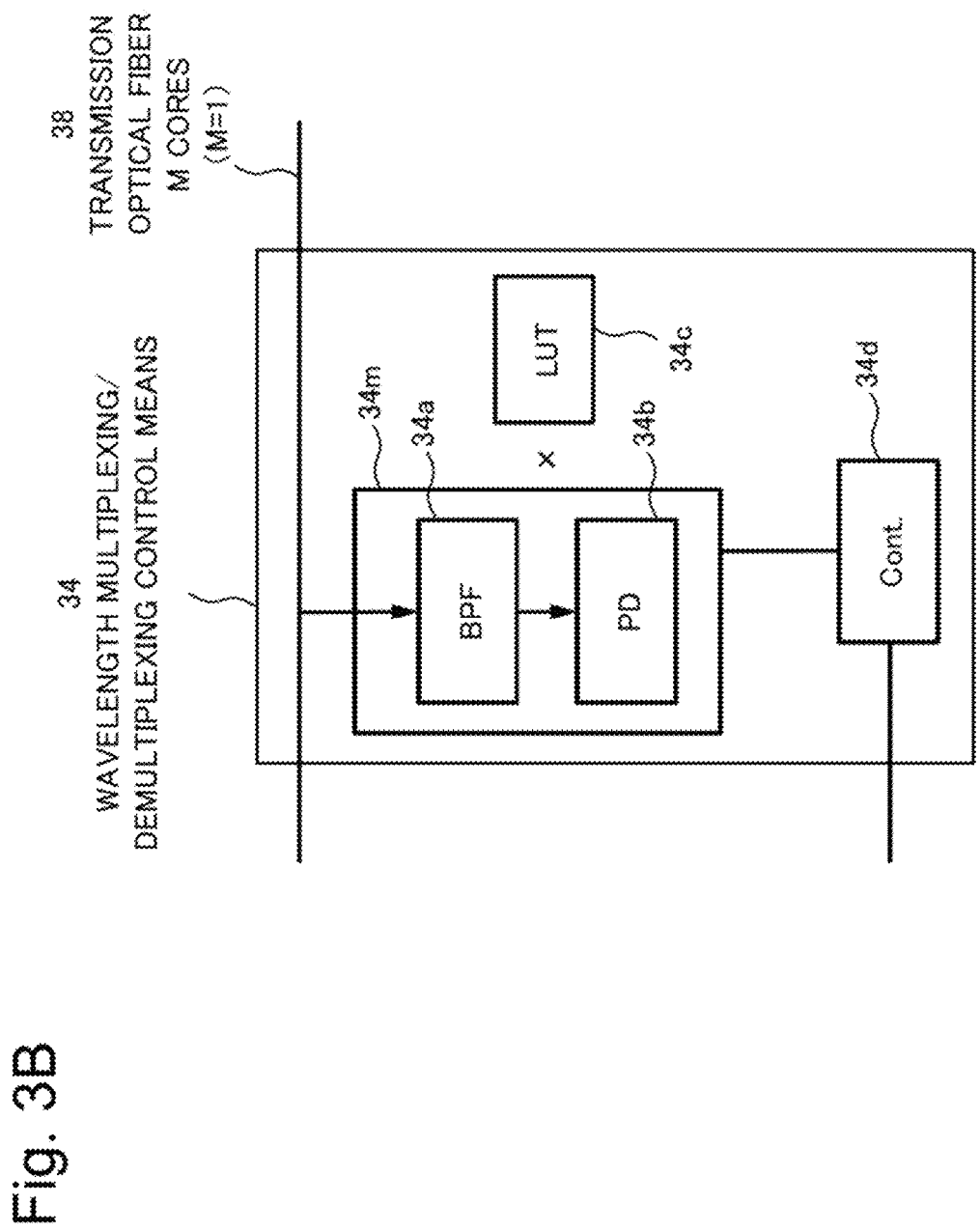
FIG. 3B is a block diagram illustrating a more specific configuration of a wavelength multiplexing/demultiplexing control means 34 in FIG. 3A.

The wavelength multiplexing/demultiplexing control means 34 of the optical amplifier 30 in FIG. 3A may be configured, similarly to FIG. 1B of the first example embodiment and FIG. 2B of the second example embodiment, by including, as illustrated in FIG. 3B, a monitoring means 34m, a look-up table (LUT) 34c, and a controller 34d that controls the wavelength demultiplexing means 32 and the wavelength multiplexing means 33. The monitoring means 34m includes, similarly to FIG. 1B of the first example embodiment and FIG. 2B of the second example embodiment, a bandpass filter (BPF) 34a that extracts, from a WDM signal amplified by the optical amplifier 30 and emitted to the transmission optical fiber 38, an optical signal of a specific wavelength band and a photodetector (PD) 34b that detects optical intensity of the specific wavelength band extracted by the BPF 34a.

According to each example embodiment of the present invention, for an optical amplifier in which a gain is likely to be different with respect to each wavelength, from among WDM signals incident from the transmission optical fiber 38, for example, a WDM signal or an optical signal of a wavelength band having a low gain and a WDM signal of a wavelength band other than the wavelength band having a low gain are demultiplexed by the wavelength demultiplexing means 32, and the WDM signal or the optical signal of a wavelength band having a low gain is amplified with a larger gain, multiplexed again by the wavelength multiplexing means 33, and emitted as a WDM signal to the transmission optical fiber 38. A way of thinking about multiplexing and a way of thinking about amplification are similar to the description according to the above-described first example embodiment, except for not being a clad collective excitation method.

Advantageous Effects of Example Embodiment

According to the present example embodiment, for an optical amplifier in which a gain is likely to be different with respect to each wavelength, demultiplexing is performed, for example, into an optical signal of a wavelength band having large optical amplification efficiency and an optical signal of a wavelength band having small optical amplification efficiency, the demultiplexed optical signals are amplified by separate single-core EDFAs 31, and thereby amplification can be performed with an appropriate amplification rate in such a way as to be not excessively large or small for each wavelength band. Thereby, it is possible to achieve an optical fiber amplifier, an optical fiber amplifier controlling method, and an optical transmission system capable of reducing wavelength dependency of a signal gain while increasing usage efficiency of a supplied-power resource. Compared with the optical amplifier in Background Art, power consumption in an optical amplifier can be reduced.

According to the present example embodiment, it has been described that the wavelength multiplexing/demultiplexing control means 34 monitors an amplified WDM signal, in particular, monitors an amplification rate of a specific wavelength band, but a target being monitored by the wavelength multiplexing/demultiplexing control means 34 is not limited to an amplification rate itself of a specific wavelength band. The wavelength multiplexing/demultiplexing control means 34 may be configured in such a way as to monitor a scale associated with an amplification rate of a specific wavelength band and control, according to a monitoring result, demultiplexing performed by the wavelength demultiplexing means 32 and multiplexing performed by the wavelength multiplexing means 33.

Example Embodiment of Higher-Level Concept

Figure 5:
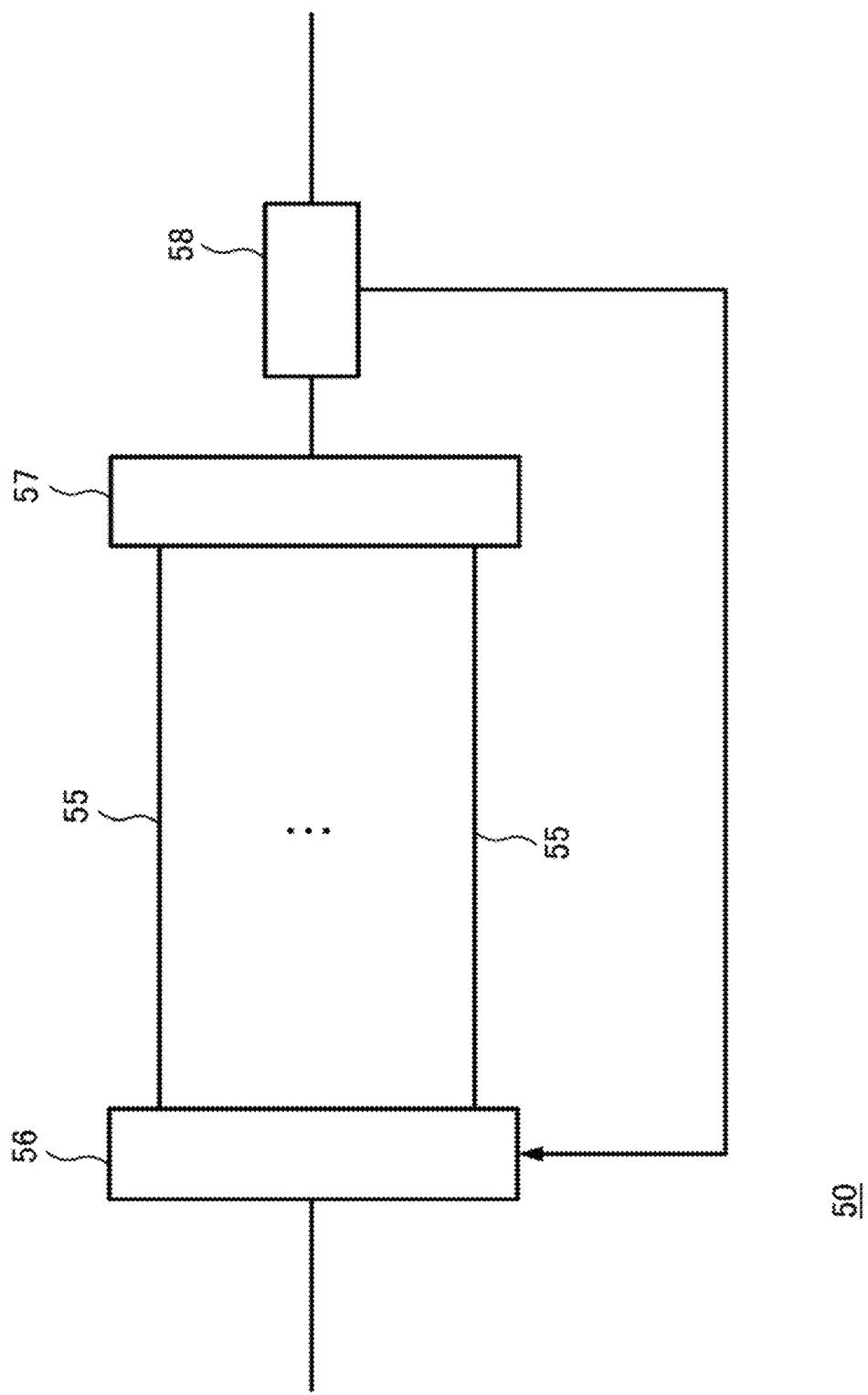
FIG. 5 is a configuration diagram for describing an optical amplifier according to an example embodiment based on a higher-level concept of the present invention.

An optical amplifier according to an example embodiment of a higher-level concept of the present invention in which the above-described first example embodiment to third example embodiment are subjected to higher-level conceptualization is described. FIG. 5 is a configuration diagram for describing an optical amplifier according to an example embodiment based on a higher-level concept of the present invention. An optical amplifier 50 in FIG. 5 is an optical amplifier that amplifies an incident wavelength division multiplexing (WDM) signal and includes two or more cores 55 including an amplification medium. Herein, the amplification medium is an impurity doped optical fiber such as an erbium doped optical fiber. An optical amplifier including two or more cores 55 including the amplification medium may be configured by using a multi-core optical amplifier as described according to the first example embodiment and the second example embodiment or may be configured by using a plurality of single-core optical amplifiers as described according to the third example embodiment.

The optical amplifier 50 in FIG. 5 further includes a wavelength demultiplexing means 56 for demultiplexing the incident WDM signal into optical signals of two or more wavelength bands and separately introducing the demultiplexed optical signals to the two or more cores 55 and a wavelength multiplexing means 57 for multiplexing optical signals propagated through the two or more cores 55 and amplified and outputting the multiplexed optical signal. The optical amplifier 50 in FIG. 5 further includes a wavelength demultiplexing control means 58 for monitoring an amplified WDM signal and controlling, according to a monitoring result, the wavelength demultiplexing means 56.

According to the optical amplifier 50 of the present example embodiment, it is possible to provide an optical amplifier capable of reducing wavelength dependency of a signal gain while increasing usage efficiency of a supplied-power resource. The reason is that an amplified WDM signal is being monitored, the monitored WDM signal is demultiplexed into a plurality of wavelength bands by the wavelength demultiplexing means 56, the demultiplexed optical signals are amplified by separate cores 55, and the amplified optical signals are multiplexed. When an amplified WDM signal is monitored, an amplification rate of a specific wavelength band is monitored or a scale associated with an amplification rate of a specific wavelength band is monitored. During demultiplexing, according to a monitoring result, from an incident WDM signal, an optical signal of the specific wavelength band is demultiplexed. According to a monitoring result, a WDM signal is demultiplexed into a plurality of wavelength bands, for example, in such a way as to be an optical signal of a wavelength band having small optical amplification efficiency and an optical signal of a wavelength band other than the wavelength band having small optical amplification efficiency or to be an optical signal of a wavelength band having small optical amplification efficiency and an optical signal of a wavelength band having large optical amplification efficiency. When amplification is performed by separate cores 55, an optical signal of a wavelength band having small optical amplification efficiency is amplified with a relatively-large amplification rate. The reason is that in this manner, amplification is performed by separate cores 55, and thereby an optical amplifier is able to perform amplification with an appropriate amplification rate in such a way as to be excessively large or small with respect to each wavelength band.

Other Example Embodiments

According to the first example embodiment, it has been described that the wavelength multiplexing/demultiplexing control means 14 monitors an amplification rate of a specific wavelength band or monitors optical amplification efficiency and a gain variation of a specific wavelength band, but is not limited thereto. It is conceivable that the wavelength multiplexing/demultiplexing control means 14 is configured in such a way as to monitor optical amplification efficiency and a noise figure (NF) variation of a specific wavelength band. Alternatively, it is conceivable that the wavelength multiplexing/demultiplexing control means 14 is configured in such a way as to monitor optical amplification efficiency and a generalized optical signal to noise ratio (G-OSNR) variation of a specific wavelength band.

Figure 4C:
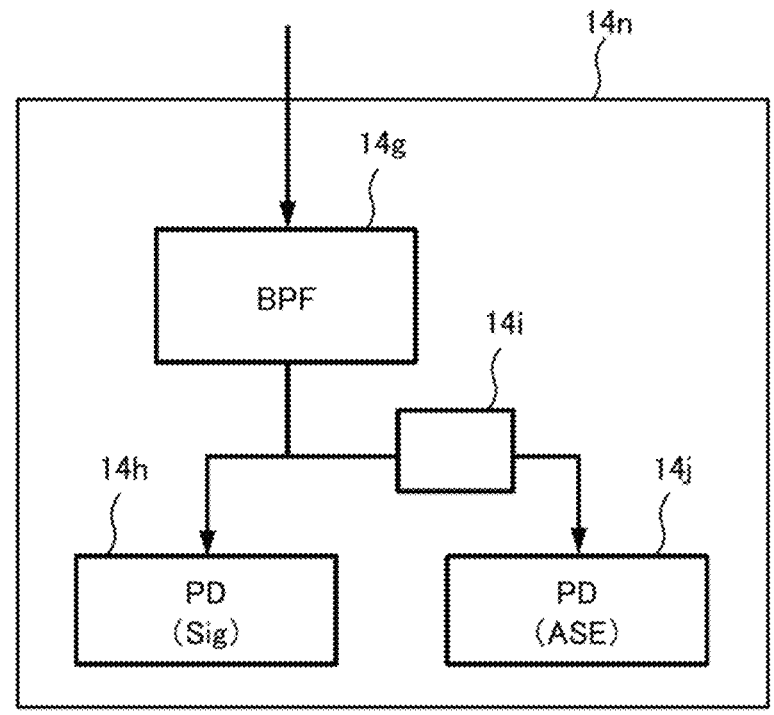
FIG. 4C includes a block diagram of a monitoring means 14n for describing monitoring of an NF variation of an optical signal of a specific wavelength band.
Figure 4D:
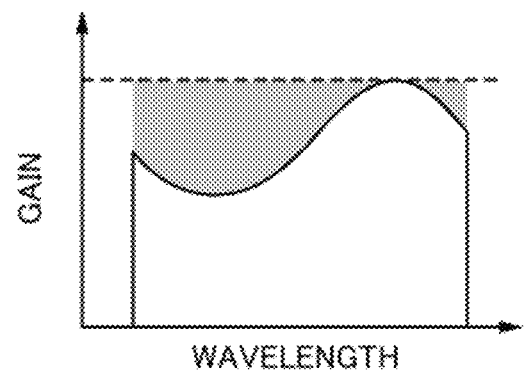
FIG. 4D includes a graph illustrating wavelength gain characteristics for describing monitoring of an NF variation of an optical signal of a specific wavelength band.
Figure 4E:
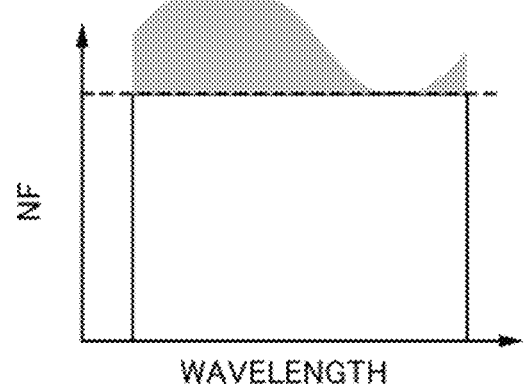
FIG. 4E includes a graph illustrating wavelength NF characteristics for describing monitoring of an NF variation of an optical signal of a specific wavelength band.

FIG. 4C to FIG. 4E include a block diagram of a monitoring means 14n and graphs illustrating wavelength gain characteristics and wavelength NF characteristics for describing monitoring of an NF variation of a specific wavelength band. When optical amplification efficiency and an NF variation of a specific wavelength band are being monitored, instead of the monitoring means 14m of the wavelength multiplexing/demultiplexing control means 14 in FIG. 1B, a monitoring means 14n illustrated in FIG. 4C is used. A plurality of monitoring means 14n are provided, by assuming, similarly to the monitoring means 14m according to the first example embodiment, a wavelength band included in an amplified WDM signal. The monitoring means 14n in FIG. 4C includes a BPF 14g that extracts, from an amplified WDM signal, an optical signal of a specific wavelength band, a PD 14h that monitors optical signal intensity of a wavelength band extracted by the BPF 14g, a polarizer 14i, and a PD 14j that monitors amplified spontaneous emission (ASE) intensity. The ASE intensity is measured by eliminating an optical signal by using the polarizer 14i orthogonal to a polarized wave of an optical signal and doubling an intensity value (a polarization-nulling method). In this manner, a G-OSNR in a latter stage of an optical amplifier can be determined.

In order to monitor an NF variation, the monitoring means 14n in FIG. 4C is also provided in a former stage of an optical amplifier. From a difference between a G-OSNR in a latter stage and a G-OSNR in the former stage of the optical amplifier, an NF of the optical amplifier is acquired.

In FIG. 4D and FIG. 4E, wavelength gain characteristics and wavelength NF characteristics of an optical amplifier are illustrated. A waveform of wavelength NF characteristics has a correlation in such a way that data of wavelength gain characteristics are reversed at a certain gain level, as a center, indicated with a dotted line. In an optical signal of a wavelength band having a large gain, a NF is small, and in an optical signal of a wavelength band having a small gain, a NF is large. In consideration of the relation, demultiplexing is performed into an optical signal of a wavelength band having large NF and an optical signal of a wavelength band having small NF and the demultiplexed optical signals are amplified by separate cores. In consideration of a scale "area/optical amplification efficiency" as illustrated in FIG. 4A and FIG. 4B, a configuration is made in such a way as to calculate a separation band where "area/optical amplification efficiency" is equal, perform demultiplexing, and perform amplification by using separate cores.

Figure 4F:
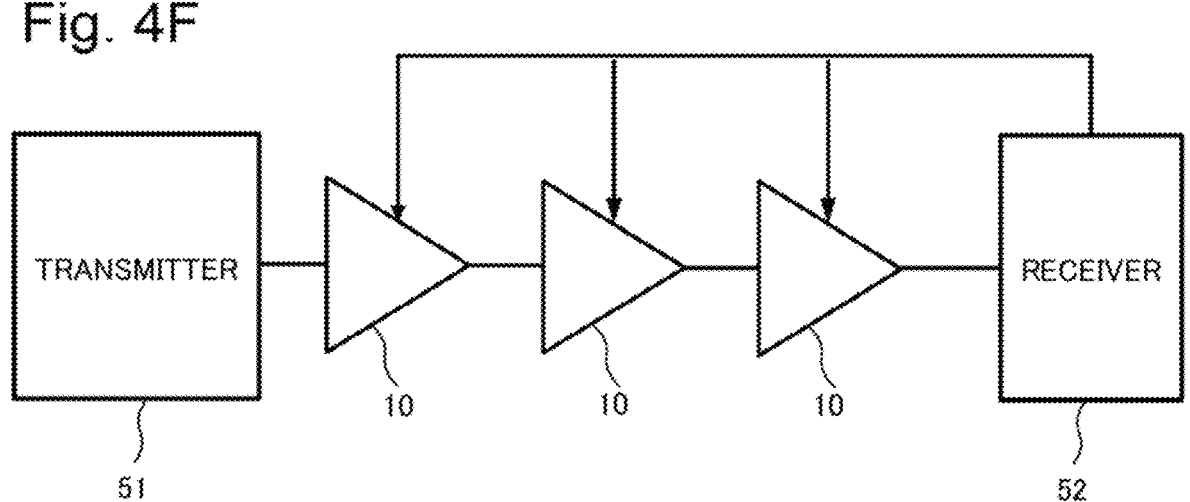
FIG. 4F includes a block diagram for describing monitoring of a G-OSNR variation of an optical signal of a specific wavelength band.
Figure 4G:
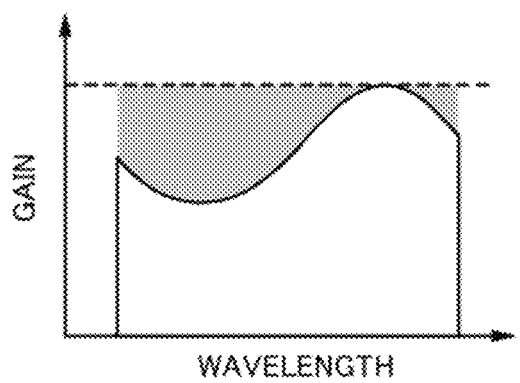
FIG. 4G includes a graph illustrating wavelength gain characteristics for describing monitoring of a G-OSNR variation of an optical signal of a specific wavelength band.
Figure 4H:
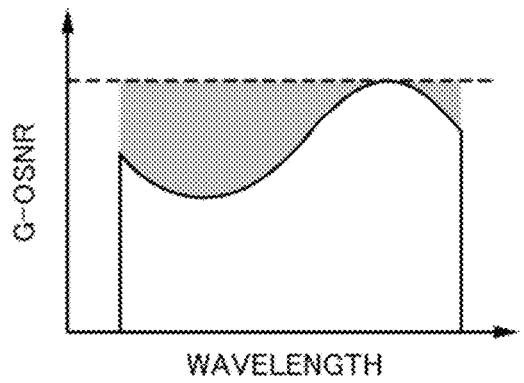
FIG. 4H includes a graph illustrating wavelength G-OSNR characteristics for describing monitoring of a G-OSNR variation of an optical signal of a specific wavelength band.

FIG. 4F to FIG. 4H are a block diagram for describing monitoring of a G-OSNR variation of a specific wavelength band and graphs illustrating wavelength gain characteristics and wavelength G-OSNR characteristics.

When optical amplification efficiency and a G-OSNR variation of a specific wavelength band are being monitored, instead of providing the monitoring means 14m of the wavelength multiplexing/demultiplexing control means 14 in FIG. 1B, a G-OSNR is monitored by a receiver of a terminal on a reception side of an optical transmission system. In a case where an optical transmission system configured by inserting a plurality of repeaters in a transmission optical fiber connecting terminals, from a receiver 52 of a terminal on a reception side in a block diagram illustrated in FIG. 4F, a monitoring result of a G-OSNR is transmitted to an optical amplifier 10 of each repeater. In the receiver 52 of the terminal on the reception side, a WDM signal transmitted from a transmitter 51 of a terminal on a transmission side and propagated through a plurality of optical amplifiers 10 connected in series is received, with respect to each wavelength, after being demultiplexed. In the receiver 52 of the terminal on the reception side, an S/N level of the reception signal is arranged again along a wavelength axis and transmitted as an acquired monitoring value to each optical amplifier 10.

In FIG. 4G and FIG. 4H, wavelength gain characteristics and wavelength G-OSNR characteristics of an optical amplifier are illustrated. A waveform of the wavelength G-OSNR characteristics is similar to a waveform of the wavelength gain characteristics. Demultiplexing is performed into an optical signal of a wavelength band having large G-OSNR and an optical signal of a wavelength band having small G-OSNR, and the demultiplexed optical signals are amplified by separate cores. In consideration of a scale "area/optical amplification efficiency" as described in FIG. 4A and FIG. 4B, a configuration is made in such a way as to calculate a separation band in which "area/optical amplification efficiency" is equal, perform demultiplexing, and perform amplification by using separate cores.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, a multiplexing/demultiplexing ratio for a WDM signal of a wavelength demultiplexing means according to each example embodiment of the present invention and the wavelength multiplexing means may be designed fixedly or may be designed variably. When an operation is performed in such a way as not to modify a wavelength band of a WDM signal transmitted via a transmission optical fiber in an optical transmission system, a multiplexing/demultiplexing ratio may not necessarily be modified, and therefore the multiplexing/demultiplexing ratio may be designed fixedly. In an optical transmission system operated by inserting a plurality of optical amplifiers according to the example embodiments of the present invention in a transmission optical fiber, it is conceivable that multiplexing/demultiplexing ratios for WDM signals of wavelength demultiplexing means of optical amplifiers and the wavelength multiplexing means are designed as the same value. In an optical transmission system operated by inserting a plurality of optical amplifiers according to the example embodiments of the present invention in a transmission optical fiber, it is conceivable that a multiplexing/demultiplexing ratio for a WDM signal of a wavelength demultiplexing means of one optical amplifier and the wavelength multiplexing means is designed in such a way as to be different from a multiplexing/demultiplexing ratio for a WDM signal of a wavelength demultiplexing means of one of other optical amplifiers and the wavelength multiplexing means.

It is conceivable that a multiplexing/demultiplexing ratio for a WDM signal of a wavelength demultiplexing means according to each example embodiment of the present invention and the wavelength multiplexing means may be set only once before an operation of an optical transmission system is started, or it is conceivable that the setting is executed regularly or irregularly after an operation of the optical transmission system is started.

The whole or part of the example embodiments disclosed above can be described as, but not limited to, the following supplementary notes.

(Supplementary note 1) An optical amplifier that amplifies an incident wavelength division multiplexing (WDM) signal and includes two or more cores having an amplification medium, the optical amplifier including:
a wavelength demultiplexing means for demultiplexing the incident WDM signal into optical signals of two or more wavelength bands and introducing the demultiplexed optical signals into the two or more cores separately; a wavelength multiplexing means for multiplexing optical signals propagated through the two or more cores and amplified, and outputting the multiplexed signal; and a wavelength demultiplexing control means for monitoring an amplification rate of a specific wavelength band of an amplified WDM signal or a scale associated with an amplification rate of a specific wavelength band, demultiplexing, from the incident WDM signal, an optical signal of a wavelength band having relatively-small optical amplification efficiency according to a monitoring result, and controlling demultiplexing performed by the wavelength demultiplexing means in such a way as to amplify, with a relatively-large amplification rate, the optical signal of the wavelength band having relatively-small optical amplification efficiency.

(Supplementary note 2) The optical amplifier according to supplementary note 1, wherein the wavelength demultiplexing control means is a wavelength multiplexing/demultiplexing control means for controlling, according to the monitoring result, demultiplexing performed by the wavelength demultiplexing means and multiplexing performed by the wavelength multiplexing means.

(Supplementary note 3) The optical amplifier according to supplementary note 2, wherein the optical amplifier is N single-core optical amplifiers into which the WDM signal is incident from a transmission optical fiber having M cores (where M=1 and N≥M+1).

(Supplementary note 4) The optical amplifier according to supplementary note 2, wherein the optical amplifier
is a multi-core optical amplifier having N cores into which the WDM signal is incident from a transmission optical fiber having M cores (where M=1 and N≥M+1) and
includes a clad collective excitation means.

(Supplementary note 5) The optical amplifier according to supplementary note 2, wherein the optical amplifier
is a multi-core optical amplifier having N cores into which the WDM signal is incident from a transmission optical fiber having M cores (where M≥1 and N≥M+1) and includes a clad collective excitation means.

(Supplementary note 6) The optical amplifier according to any one of supplementary notes 3 to 5, wherein the wavelength multiplexing/demultiplexing control means monitors optical amplification efficiency and a gain variation and multiplexes/demultiplexes the incident WDM signal into a plurality of amplifiers or a plurality of cores of an amplifier.

(Supplementary note 7) The optical amplifier according to any one of supplementary notes 3 to 5, wherein the wavelength multiplexing/demultiplexing control means monitors optical amplification efficiency and a noise figure (NF) variation and multiplexes/demultiplexes the incident WDM signal into a plurality of amplifiers or a plurality of cores of an amplifier.

(Supplementary note 8) The optical amplifier according to any one of supplementary notes 3 to 5, wherein the wavelength multiplexing/demultiplexing control means monitors optical amplification efficiency and a generalized optical signal to noise ratio (G-OSNR) variation and multiplexes/demultiplexes the incident WDM signal into a plurality of amplifiers or a plurality of cores of an amplifier.

(Supplementary note 9) The optical amplifier according to any one of supplementary notes 3 to 5, wherein a multiplexing/demultiplexing ratio of each of the wavelength demultiplexing means and the wavelength multiplexing means is a fixed value.

(Supplementary note 10) An optical transmission system including
a transmission optical fiber and a plurality of the optical amplifiers according to any one of supplementary notes 6 to 9, being inserted in the transmission optical fiber, wherein
values of multiplexing/demultiplexing ratios of the wavelength demultiplexing means and the wavelength multiplexing means of the plurality of optical amplifiers are the same as each other.

(Supplementary note 11) An optical transmission system including
a transmission optical fiber and a plurality of optical amplifiers according to any one of supplementary notes 6 to 9, being inserted in the transmission optical fiber, wherein one or more multiplexing/demultiplexing ratios of the wavelength demultiplexing means and the wavelength multiplexing means of the plurality of optical amplifiers are different.

(Supplementary note 12) An optical amplifier controlling method being a method of controlling an optical amplifier into which a wavelength division multiplexing (WDM) signal is incident from a transmission optical fiber having M cores, the method including:

monitoring an optical signal of a specific wavelength band of a WDM signal amplified by the optical amplifier;

demultiplexing, from a WDM signal incident from the transmission optical fiber, the optical signal of the specific wavelength band according to a monitoring result; and separately amplifying the optical signal of the specific wavelength band and the WDM signal from which the optical signal of the specific wavelength is demultiplexed, multiplexing the amplified optical signal of the specific wavelength band and the amplified WDM signal from which the optical signal of the specific wavelength is demultiplexed, and outputting the multiplexed signal.

REFERENCE SIGNS LIST 10, 10B, 20, 20B, 30 Optical amplifier
11, 21 MC-EDFA
12, 22, 32 Wavelength demultiplexing means
13, 23, 33 Wavelength multiplexing means
14, 24, 34 Wavelength multiplexing/demultiplexing control means
14a, 24a BPF
14b, 24b PD
14c, 24c LUT
14d, 14e, 24d, 24e Controller
14m, 24m, 34m Monitoring means
15, 25 LD
18, 28, 38 Transmission optical fiber
19, 29, 39 SM fiber
31 Single-core EDFA

What is claimed is:

1. An optical amplifier configured to amplify an incident wavelength division multiplexing (WDM) signal and includes two or more cores having an amplification medium, the optical amplifier comprising:
a wavelength demultiplexer configured to demultiplex the incident WDM signal into two or more wavelength bands and introducing the demultiplexed WDM signals into the two or more cores separately;
a wavelength multiplexer configured to multiplex amplified optical signals propagated through the two or more cores and outputting the multiplexed signal; and
a wavelength demultiplexing controller configured to monitor an amplification rate of a specific wavelength band of an amplified WDM signal or a scale associated with an amplification rate of a specific wavelength band, demultiplexing, from the incident WDM signal, an optical signal of a wavelength band having relatively-small optical amplification efficiency according to a monitoring result, and controlling demultiplexing performed by the wavelength demultiplexer in such a way as to amplify, with a relatively-large amplification rate, the optical signal of the wavelength band having relatively-small optical amplification efficiency.

2. The optical amplifier according to claim 1, wherein the wavelength demultiplexing controller is wavelength multiplexing/demultiplexing controller configured to control, according to the monitoring result, demultiplexing performed by the wavelength demultiplexer and multiplexing performed by the wavelength multiplexer.

3. The optical amplifier according to claim 2, wherein the optical amplifier is N single-core optical amplifiers into which the WDM signal is incident from a transmission optical fiber having M cores (where M=1 and N≥M+1).

4. The optical amplifier according to claim 2, wherein the optical amplifier is a multi-core optical amplifier having N cores into which the WDM signal is incident from a transmission optical fiber having M cores (where M=1 and N≥M+1), and
the optical amplifier includes a clad collective excitation circuit.

5. The optical amplifier according to claim 2, wherein the optical amplifier is a multi-core optical amplifier having N cores into which the WDM signal is incident from a transmission optical fiber having M cores (where M>1 and N≥M+1), and
the optical amplifier includes a clad collective excitation circuit.

6. The optical amplifier according to claim 3, wherein the wavelength multiplexing/demultiplexing controller monitors optical amplification efficiency and a gain variation and multiplexes/demultiplexes the incident WDM signal into a plurality of amplifiers or a plurality of cores of an amplifier.

7. The optical amplifier according to claim 3, wherein the wavelength multiplexing/demultiplexing controller monitors optical amplification efficiency and a noise figure (NF) variation and multiplexes/demultiplexes the incident WDM signal into a plurality of amplifiers or a plurality of cores of an amplifier.

8. The optical amplifier according to claim 3, wherein the wavelength multiplexing/demultiplexing controller monitors optical amplification efficiency and a generalized optical signal to noise ratio (G-OSNR) variation and multiplexes/demultiplexes the incident WDM signal into a plurality of amplifiers or a plurality of cores of an amplifier.

9. The optical amplifier according to claim 3, wherein a multiplexing/demultiplexing ratio of each of the wavelength demultiplexer and the wavelength multiplexer is a fixed value.

10. An optical transmission system comprising
a transmission optical fiber, and a plurality of the optical amplifiers according to claim 6, being inserted in the transmission optical fiber, wherein
values of multiplexing/demultiplexing ratios of the wavelength demultiplexer and the wavelength multiplexer of the plurality of optical amplifiers are the same as each other.

11. An optical transmission system comprising
a transmission optical fiber, and a plurality of the optical amplifiers according to claim 6, being inserted in the transmission optical fiber, wherein
one or more multiplexing/demultiplexing ratios of the wavelength demultiplexer and the wavelength multiplexer of the plurality of optical amplifiers are different.

12. An optical amplifier controlling method being a method of controlling an optical amplifier into which a wavelength division multiplexing (WDM) signal is incident from a transmission optical fiber having M cores, the method comprising:
- monitoring an optical signal of a specific wavelength band of a WDM signal amplified by the optical amplifier;
- demultiplexing, from a WDM signal incident from the transmission optical fiber, the optical signal of the specific wavelength band according to a monitoring result; and
- separately amplifying the optical signal of the specific wavelength band and the WDM signal from which the optical signal of the specific wavelength is demultiplexed, multiplexing the amplified optical signal of the specific wavelength band and the amplified WDM signal from which the optical signal of the specific wavelength is demultiplexed, and outputting the multiplexed signal.

* * * * *